US009784201B2

(12) United States Patent
Oyagi et al.

(10) Patent No.: US 9,784,201 B2
(45) Date of Patent: Oct. 10, 2017

(54) CONTROL DEVICE FOR INTERNAL COMBUSTION ENGINE

(71) Applicants: Hiroshi Oyagi, Susono (JP); Kazuyasu Iwata, Fuji (JP); Akira Yamashita, Mishima (JP)

(72) Inventors: Hiroshi Oyagi, Susono (JP); Kazuyasu Iwata, Fuji (JP); Akira Yamashita, Mishima (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 121 days.

(21) Appl. No.: 14/896,204

(22) PCT Filed: Jun. 5, 2013

(86) PCT No.: PCT/JP2013/065595
§ 371 (c)(1),
(2) Date: Dec. 4, 2015

(87) PCT Pub. No.: WO2014/196036
PCT Pub. Date: Dec. 11, 2014

(65) Prior Publication Data

US 2016/0115890 A1 Apr. 28, 2016

(51) Int. Cl.
*B60T 7/12* (2006.01)
*F02D 41/06* (2006.01)
(Continued)

(52) U.S. Cl.
CPC ......... *F02D 41/068* (2013.01); *F01N 3/2006* (2013.01); *F01P 3/20* (2013.01);
(Continued)

(58) Field of Classification Search
CPC ... F01N 3/2006; F01P 11/16; F01P 2003/001; F01P 3/20; F02D 2200/021;
(Continued)

(56) References Cited

U.S. PATENT DOCUMENTS

| | | | | |
|---|---|---|---|---|
| 5,698,776 | A | 12/1997 | Tomisawa | |
| 2003/0079716 | A1 * | 5/2003 | Miura | F02D 35/028 123/299 |

(Continued)

FOREIGN PATENT DOCUMENTS

| | | | |
|---|---|---|---|
| EP | 2 375 034 | A2 | 10/2011 |
| JP | 03-031539 | A | 2/1991 |

(Continued)

*Primary Examiner* — Marguerite McMahon
*Assistant Examiner* — Tea Holbrook
(74) *Attorney, Agent, or Firm* — Finnegan, Henderson, Farabow, Garrett & Dunner, LLP

(57) ABSTRACT

The invention relates to a control device for an internal combustion engine using the center-of-gravity position of a heat generation rate for combustion control. This control device controls the center-of-gravity position of a heat generation rate to correspond to a reference position in a case where an engine cooling water temperature is equal to or higher than a reference cooling water temperature and controls the center-of-gravity position of a heat generation rate to correspond to a crank angle further on an advance side than the reference position in a case where the engine cooling water temperature is lower than the reference cooling water temperature.

17 Claims, 19 Drawing Sheets

(51) Int. Cl.

| | |
|---|---|
| ***F02M 26/53*** | (2016.01) |
| ***F02D 35/02*** | (2006.01) |
| ***F01N 3/20*** | (2006.01) |
| ***F01P 3/20*** | (2006.01) |
| ***F01P 11/16*** | (2006.01) |
| ***F02D 41/00*** | (2006.01) |
| ***F02D 41/30*** | (2006.01) |
| *F02M 26/00* | (2016.01) |
| *F01P 3/00* | (2006.01) |

(52) U.S. Cl.
CPC ............ *F01P 11/16* (2013.01); *F02D 35/023* (2013.01); *F02D 35/026* (2013.01); *F02D 35/028* (2013.01); *F02D 41/005* (2013.01); *F02D 41/0077* (2013.01); *F02D 41/3005* (2013.01); *F02M 26/53* (2016.02); *F01P 2003/001* (2013.01); *F02D 2200/021* (2013.01); *F02M 2026/004* (2016.02)

(58) Field of Classification Search
CPC .... F02D 35/023; F02D 35/026; F02D 35/028; F02D 41/005; F02D 41/0077; F02D 41/068; F02D 41/3005; F02M 2026/004; F02M 26/53
See application file for complete search history.

(56) References Cited

U.S. PATENT DOCUMENTS

| | | | | |
|---|---|---|---|---|
| 2005/0274352 | A1 | 12/2005 | Canale et al. | |
| 2010/0043749 | A1* | 2/2010 | Suda ..................... | F02D 35/023 123/406.41 |
| 2011/0079194 | A1* | 4/2011 | Tanaka ................ | F02D 41/3035 123/295 |
| 2015/0147598 | A1 | 5/2015 | Inoue et al. | |
| 2016/0123264 | A1* | 5/2016 | Oyagi ................... | F02D 35/023 701/105 |
| 2016/0123269 | A1* | 5/2016 | Iwata ...................... | F02D 23/02 701/104 |

FOREIGN PATENT DOCUMENTS

| | | | |
|---|---|---|---|
| JP | 8-232820 | | 9/1996 |
| JP | 11-351026 | A | 12/1999 |
| JP | 2003-500596 | | 1/2003 |
| JP | 2009-36086 | A | 2/2009 |
| JP | 2009-209943 | | 9/2009 |
| JP | 2011-202629 | | 10/2011 |
| JP | 2011-220186 | A | 11/2011 |
| WO | WO 2014/002227 | A1 | 1/2014 |
| WO | WO 2014/196034 | A1 | 12/2014 |

* cited by examiner

G: CENTER-OF-GRAVITY POSITION OF HEAT GENERATION RATE
Gt: REFERENCE POSITION
CAit: TARGET INJECTION TIMING
ΔCA: PREDETERMINED CRANK ANGLE

Pr: REQUIRED OUTPUT
TAU: TARGET INJECTION QUANTITY
Pit: TARGET INJECTION PRESSURE
Pimt: TARGET TURBOCHARGING PRESSURE
α: PILOT INJECTION RATIO
TAUp: PILOT INJECTION QUANTITY
TAUm: MAIN INJECTION QUANTITY
CAib: REFERENCE INJECTION TIMING

CONTROL DEVICE FOR INTERNAL COMBUSTION ENGINE

CROSS-REFERENCE TO RELATED APPLICATIONS

This application is a national phase application of International Application No, PCT/JP2013/065595 filed Jun. 5, 2013, the content of which is incorporated herein by reference.

BACKGROUND OF THE INVENTION

1. Field of the Invention

The invention relates to a control device for an internal combustion engine.

2. Description of Related Art

PTL 1 discloses a closed-loop electronic control system for diesel engine combustion control, which allows premixed compression self-ignition combustion to be efficiently controlled by changing fuel injection based on the center of gravity of a combustion process and a reference value thereof.

CITATION LIST

Patent Literature

PTL 1: Japanese Patent Application Publication No. 2009-209943

PTL 2: Japanese Patent Application Publication No. 2011-202629

PTL 3: Japanese Patent Application Publication No. 2003-500596

PTL 4: Japanese Patent Application Publication No. 8-232820

SUMMARY OF THE INVENTION

Various control devices have been developed for internal combustion engines (hereinafter, referred to as "engines") for the purpose of a reduction in fuel consumption. In this regard, at least a target value that varies depending on an engine load is required to be set because of the variety of the types of engine control parameters affecting fuel consumption. In this regard, it has been found by the inventors' research that the center-of-gravity position of a heat generation rate at which fuel consumption is minimized is constant regardless of the engine load, and thus the engine control parameters can be controlled very conveniently so that fuel consumption is minimized when the center-of-gravity position of a heat generation rate is used for combustion control.

A low level of fuel consumption means that the sum of cooling loss and exhaust loss is small. In other words, a low level of fuel consumption means that the amount of heat transferred from the inside of a combustion chamber to the main body of the engine is small and the amount of heat released from the combustion chamber with exhaust gas is small. Accordingly, in a case where the center-of-gravity position of a heat generation rate is controlled to correspond to a reference position (that is, the center-of-gravity position of a heat generation rate at which fuel consumption is minimized) while engine warm-up is required, the amount of the heat transferred from the inside of the combustion chamber to the main body of the engine is small, and thus the progress of the engine warm-up might slow down. In a case where the center-of-gravity position of a heat generation rate is controlled to correspond to the reference position while catalyst warm-up is required, the amount of the heat released from the combustion chamber with the exhaust gas is small, and thus the progress of the catalyst warm-up might slow down. In any case, it is not preferable to control the center-of-gravity position of a heat generation rate to correspond to the reference position for the engine warm-up or the catalyst warm-up to be completed quickly while the engine warm-up is required or the catalyst warm-up is required.

An object of the invention is to quickly warm up an internal combustion engine or a catalyst with a control device for an internal combustion engine including an exhaust gas purification catalyst and using the center-of-gravity position of a heat generation rate for combustion control.

The invention relates to a control device for an internal combustion engine using the center-of-gravity position of a heat generation rate for combustion control. The center-of-gravity position of a heat generation rate means the position described below.

As illustrated in FIG. 2, the center-of-gravity position of a heat generation rate G is a crank angle that corresponds to the geometric center of gravity Gg of a region A (hatched part in FIG. 2) which is defined by the waveform W of the heat generation rate with respect to the crank angle. More specifically, the center-of-gravity position of a heat generation rate is the crank angle that corresponds to the geometric center of gravity of the region which is surrounded by the waveform of the heat generation rate drawn in a coordinate system in which the horizontal axis represents the crank angle and the vertical axis represents the heat generation rate and the horizontal axis. The horizontal axis and the vertical axis are axes that are orthogonal to each other.

In other words, the center-of-gravity position of a heat generation rate is the crank angle that corresponds to the geometric center of gravity of the region which is surrounded by the waveform of the heat generation rate drawn in a graph (such as the coordinate system) in which the crank angle for each cycle is set on one axis (such as the horizontal axis) and the heat generation rate is set on the other axis (such as the vertical axis) orthogonal to the axis, and the axis. In other words, the center-of-gravity position of a heat generation rate is the crank angle that corresponds to the geometric center of gravity of the region which is defined by the waveform of the heat generation rate with respect to the crank angle.

In other words, the center-of-gravity position of a heat generation rate is a specific crank angle at which the value that is obtained by integrating the value corresponding to the product of the value obtained by subtracting the specific crank angle from an arbitrary crank angle for each cycle and the heat generation rate at the arbitrary crank angle with respect to the crank angle is 0. In other words, the center-of-gravity position of a heat generation rate is the specific crank angle G pertaining to a case where the following Equation (1) is satisfied. The specific crank angle is a crank angle between combustion initiation and combustion termination in a single expansion stroke.

$$\int_{CAs}^{CAe}(\theta-G)dQ(\theta)d\theta=0 \tag{1}$$

In other words, the center-of-gravity position of a heat generation rate is a specific crank angle pertaining to a case where the value that is obtained by integrating the product of the crank angle difference between an arbitrary crank angle which is further on an advance side than the specific crank angle and the specific crank angle, and the heat generation rate at the arbitrary crank angle with respect to a crank angle and the value that is obtained by integrating the product of the crank angle difference between an arbitrary crank angle which is further on a retard side than the specific crank angle and the specific crank angle, and the heat generation rate at the arbitrary crank angle with respect to a crank angle are equal to each other.

In other words, the center-of-gravity position of a heat generation rate is an arbitrary crank angle pertaining to a case where the total sum of the product of each heat generation rate further on the advance side than the arbitrary crank angle and the crank angle distances respectively corresponding to the heat generation rates is equal to the total sum of the product of each heat generation rate further on the retard side than the arbitrary crank angle and the crank angle distances respectively corresponding to the heat generation rates. The crank angle distance is the crank angle difference between the arbitrary crank angle and each crank angle. Accordingly, in a case where the center-of-gravity position of a heat generation rate is a fulcrum, the crank angle distance is the distance from the fulcrum, and the heat generation rate is a force, the moments (=force× distance=crank angle distance×heat generation rate) on both sides of the fulcrum are equal to each other.

In other words, the center-of-gravity position of a heat generation rate is a specific crank angle pertaining to a case where the value that is obtained by integrating the product of the "magnitude of the difference between an arbitrary first crank angle past the combustion initiation and the specific crank angle" and the "heat generation rate at the arbitrary first crank angle" with respect to the crank angle from the combustion initiation to the specific crank angle is equal to the value that is obtained by integrating the product of the "magnitude of the difference between an arbitrary second crank angle past the specific crank angle and the specific crank angle", and the "heat generation rate at the arbitrary second crank angle" with respect to the crank angle from the specific crank angle to the combustion termination.

In other words, the center-of-gravity position of a heat generation rate is the specific crank angle G pertaining to a case where the following Equation (2) is satisfied. In the following Equation (2), "CAs" represents a "combustion initiation crank angle (that is, crank angle at which the combustion begins)", "CAe" represents a "combustion termination crank angle (that is, crank angle at which the combustion terminates)", "9" represents the "arbitrary crank angle", and "dQ(θ)" represents the "heat generation rate at the arbitrary crank angle". The specific crank angle is a crank angle between combustion initiation and combustion termination in a single expansion stroke.

$$\int_{CAs}^{Gc}(G-\theta)dQ(\theta)d\theta=\int_{Gc}^{CAe}(\theta-G)dQ(\theta)d\theta \qquad (2)$$

In other words, the center-of-gravity position of a heat generation rate is the center-of-gravity position of a heat generation rate G that is acquired by a calculation based on the following Equation (3) when the crank angle at which the combustion of fuel begins is expressed as CAs, the crank angle at which the combustion terminates is expressed as CAe, the arbitrary crank angle is expressed as θ, and the heat generation rate at the crank angle θ is expressed as dQ(θ) for each cycle.

$$G=\frac{\int_{CAs}^{CAe}(\theta-CAs)dQ(\theta)d\theta}{\int_{CAs}^{CAe}dQ(\theta)d\theta}+CAs \qquad (3)$$

In other words, the center-of-gravity position of a heat generation rate is the value that is obtained by adding the combustion initiation crank angle to the value that is obtained by dividing the integral value of the product of the difference between the arbitrary crank angle and the combustion initiation crank angle, and the heat generation rate at the arbitrary crank angle with respect to the crank angle by the area of the region defined by the waveform of the heat generation rate with respect to the crank angle.

In other words, the center-of-gravity position of a heat generation rate is the value that is obtained by adding the combustion initiation crank angle to the value that is obtained by dividing the integral value of the product of the crank angle distance and the heat generation rate corresponding thereto with respect to the crank angle by the area of the region defined by the waveform of the heat generation rate with respect to a crank angle. The crank angle distance is the crank angle difference between the combustion initiation crank angle and each crank angle.

The control device according to the invention includes a control unit controlling the center-of-gravity position of a heat generation rate to correspond to a reference position in a case where an engine cooling water temperature is equal to or higher than a reference cooling water temperature and controlling the center-of-gravity position of a heat generation rate to correspond to a crank angle further on an advance side than the reference position in a case where the engine cooling water temperature is lower than the reference cooling water temperature.

In this case, the center-of-gravity position of a heat generation rate is further advanced than the reference position in a case where the engine cooling water temperature is lower than the reference cooling water temperature. In a case where the center-of-gravity position of a heat generation rate is a crank angle that is further on the advance side than the reference position, cooling loss is greater than in a case where the center-of-gravity position of a heat generation rate is the reference position. Accordingly, the amount of heat that is transferred to the main body of the engine from the inside of a combustion chamber increases, and thus the temperature of the engine is raised. Accordingly, the engine temperature can be raised when the engine temperature is low due to a low engine cooling water temperature.

Alternatively, the control device according to the invention includes a control unit controlling the center-of-gravity position of a heat generation rate to correspond to a reference position in a case where a catalyst temperature is equal to or higher than a reference catalyst temperature and controlling the center-of-gravity position of a heat generation rate to correspond to a crank angle further on a retard side than the reference position in a case where the catalyst temperature is lower than the reference catalyst temperature, when the internal combustion engine is provided with an exhaust gas purification catalyst.

In this case, the center-of-gravity position of a heat generation rate is further retarded than the reference position in a case where the catalyst temperature is lower than the reference catalyst temperature. In a case where the center-of-gravity position of a heat generation rate is a crank angle that is further on the retard side than the reference position, exhaust loss is greater than in a case where the center-of-gravity position of a heat generation rate is the reference position. Accordingly, the temperature of the exhaust gas that flows into the catalyst increases, and thus the catalyst temperature is raised. Accordingly, the catalyst temperature can be raised when the catalyst temperature is low.

Alternatively, the control device according to the invention includes a control unit controlling the center-of-gravity position of a heat generation rate to correspond to a reference position in a case where an engine cooling water temperature is equal to or higher than a reference cooling water temperature, controlling the center-of-gravity position of a heat generation rate to correspond to a crank angle further on an advance side than the reference position in a case where the engine cooling water temperature is lower than a center-of-gravity position switching temperature lower than the reference cooling water temperature, and controlling the center-of-gravity position of a heat generation rate to correspond to a crank angle further on a retard side than the reference position in a case where the engine cooling water temperature is lower than the reference cooling water temperature and is equal to or higher than the center-of-gravity position switching temperature, when the internal combustion engine is provided with an exhaust gas purification catalyst.

In this case, the center-of-gravity position of a heat generation rate is further advanced than the reference position in a case where the engine cooling water temperature is extremely lower than the reference cooling water temperature (that is, in a case where the engine cooling water temperature is lower than the center-of-gravity position switching temperature). Accordingly, the engine temperature is raised as described above. Accordingly, the engine temperature can be raised when the engine temperature is extremely low due to an extremely low engine cooling water temperature. The center-of-gravity position of a heat generation rate is further retarded than the reference position in a case where the engine cooling water temperature is relatively lower than the reference cooling water temperature (that is, in a case where the engine cooling water temperature is lower than the reference cooling water temperature and is equal to or higher than the center-of-gravity position switching temperature). Accordingly, the catalyst temperature is raised as described above. Accordingly, the catalyst temperature can be raised when the catalyst temperature is low due to a low engine cooling water temperature.

The control unit may control the center-of-gravity position of a heat generation rate to correspond to the crank angle further on the advance side than the reference position by an increase in an EGR amount in a case where the engine cooling water temperature is lower than the reference cooling water temperature, the engine cooling water temperature is higher than a predetermined cooling water temperature lower than the reference cooling water temperature, and an intake temperature is lower than a predetermined intake temperature and may control the center-of-gravity position of a heat generation rate to correspond to the crank angle further on the advance side than the reference position by an increase in a pilot injection quantity in a case where the engine cooling water temperature is equal to or higher than the predetermined cooling water temperature and the intake temperature is equal to or higher than the predetermined intake temperature or in a case where the engine cooling water temperature is equal to or lower than the predetermined cooling water temperature when the engine cooling water temperature is lower than the reference cooling water temperature.

In this case, the following effects are achieved. When the engine cooling water temperature is low, the level of combustibility is low due to a low engine temperature. In this case, combustibility is not improved even when the intake temperature is increased by an increase in the EGR amount, and thus the advancing of the center-of-gravity position of a heat generation rate is not achieved. In addition, an accidental fire might occur when the EGR amount is increased despite a low level of combustibility because the amount of fresh air that is suctioned into the combustion chamber (that is, the amount of oxygen) decreases. In other words, it is preferable that the center-of-gravity position of a heat generation rate is advanced by means other than an increase in the EGR amount in this case. In a case where the engine cooling water temperature is high (that is, in a case where the engine temperature is high) and the intake temperature is high, an increase in the EGR amount causes combustibility to be reduced because the level of combustibility is already high. As a result, the advancing of the center-of-gravity position of a heat generation rate is not achieved. In addition, an accidental fire might occur depending on the amount of increase in the EGR amount. In other words, it is preferable that the center-of-gravity position of a heat generation rate is advanced by means other than an increase in the EGR amount even in this case.

However, the intake temperature is raised and ignitability of the fuel is improved in some cases when the EGR amount is increased in a case where the engine cooling water temperature is higher than a predetermined cooling water temperature and the intake temperature is lower than a predetermined intake temperature (that is, in a case where the temperature inside the combustion chamber falls short of a temperature required for diffusion combustion). In this case combustibility is improved. As a result, the center-of-gravity position of a heat generation rate is advanced, and thus the engine temperature is raised. In addition, the amount of NOx generation is reduced by an increase in the EGR amount. In other words, the engine temperature is raised and the amount of NOx generation is reduced at the same time in a case where the engine cooling water temperature is high and the intake temperature is low.

The engine temperature is raised when the center-of-gravity position of a heat generation rate is advanced by an increase in the pilot injection quantity in a case where the engine cooling water temperature is lower than a predetermined cooling water temperature and the intake temperature is equal to or lower than a predetermined intake temperature, in a case where the engine cooling water temperature is lower than a predetermined cooling water temperature and the intake temperature is higher than a predetermined intake temperature, or in a case where the engine cooling water temperature is equal to or higher than a predetermined cooling water temperature and the intake temperature is equal to or higher than a predetermined intake temperature. Accordingly, the engine temperature is raised and the accidental fire is inhibited from occurring at the same time.

Alternatively, the control device according to the invention includes a control unit controlling the center-of-gravity position of a heat generation rate to correspond to a reference position in a case where engine warm-up is completed, and controlling the center-of-gravity position of a heat generation rate to correspond to a crank angle further on an advance side than the reference position in a case where the engine warm-up is required.

In this case, the center-of-gravity position of a heat generation rate is further advanced than the reference position in a case where the engine warm-up is required. Accordingly, the engine temperature is raised as described above. Accordingly, the engine can be warmed up quickly in a case where the engine warm-up is required.

Alternatively, the control device according to the invention includes a control unit controlling the center-of-gravity position of a heat generation rate to correspond to a reference position in a case where catalyst warm-up is completed, and controlling the center-of-gravity position of a heat generation rate to correspond to a crank angle further on a retard side than the reference position in a case where the catalyst warm-up is required, when the internal combustion engine is provided with an exhaust gas purification catalyst.

In this case, the center-of-gravity position of a heat generation rate is further retarded than the reference position in a case where the catalyst warm-up is required. Accordingly, the catalyst temperature is raised as described above. Accordingly, the catalyst can be warmed up quickly in a case where the catalyst warm-up is required.

Alternatively, the control device according to the invention includes a control unit controlling the center-of-gravity position of a heat generation rate to correspond to a reference position in a case where engine warm-up and catalyst warm-up are completed, controlling the center-of-gravity position of a heat generation rate to correspond to a crank angle further on an advance side than the reference position in a case where the engine warm-up is required, and controlling the center-of-gravity position of a heat generation rate to correspond to a crank angle further on a retard side than the reference position in a case where the catalyst warm-up is required, when the internal combustion engine is provided with an exhaust gas purification catalyst.

In this case, the center-of-gravity position of a heat generation rate is further advanced than the reference position in a case where the engine warm-up is required. Accordingly, the engine temperature is raised as described above. Accordingly, the engine can be warmed up quickly in a case where the engine warm-up is required. The center-of-gravity position of a heat generation rate is further retarded than the reference position in a case where the catalyst warm-up is required. Accordingly, the catalyst temperature is raised as described above. Accordingly, the catalyst can be warmed up quickly in a case where the catalyst warm-up is required.

The control unit may control the center-of-gravity position of a heat generation rate to correspond to the crank angle further on the advance side than the reference position by an increase in an EGR amount in a case where the engine cooling water temperature is higher than a predetermined cooling water temperature, and the intake temperature is lower than a predetermined intake temperature and may control the center-of-gravity position of a heat generation rate to correspond to the crank angle further on the advance side than the reference position by an increase in a pilot injection quantity in a case where the engine cooling water temperature is higher than the predetermined cooling water temperature and the intake temperature is equal to or higher than the predetermined intake temperature or in a case where the engine cooling water temperature is equal to or lower than the predetermined cooling water temperature, when the engine warm-up is required.

In this case, the following effects are achieved. When the engine cooling water temperature is low, the level of combustibility is low due to a low engine temperature. In this case, combustibility is not improved even when the intake temperature is increased by an increase in the EGR amount, and thus the advancing of the center-of-gravity position of a heat generation rate is not achieved. In addition, an accidental fire might occur when the EGR amount is increased despite a low level of combustibility because the amount of fresh air that is suctioned into the combustion chamber (that is, the amount of oxygen) decreases. In other words, it is preferable that the center-of-gravity position of a heat generation rate is advanced by means other than an increase in the EGR amount in this case. In a case where the engine cooling water temperature is high (that is, in a case where the engine temperature is high) and the intake temperature is high, an increase in the EGR amount causes combustibility to be reduced because the level of combustibility is already high. As a result, the advancing of the center-of-gravity position of a heat generation rate is not achieved. In addition, an accidental fire might occur depending on the amount of increase in the EGR amount. In other words, it is preferable that the center-of-gravity position of a heat generation rate is advanced by means other than an increase in the EGR amount even in this case.

However, the intake temperature is raised and ignitability of the fuel is improved in some cases when the EGR amount is increased in a case where the engine cooling water temperature is higher than a predetermined cooling water temperature and the intake temperature is lower than a predetermined intake temperature (that is, in a case where the temperature inside the combustion chamber falls short of a temperature required for diffusion combustion). In this case, combustibility is improved. As a result, the center-of-gravity position of a heat generation rate is advanced, and thus the engine warm-up is promoted. In addition, the amount of NOx generation is reduced by an increase in the EGR amount. In other words, the engine warm-up is promoted and the amount of NOx generation is reduced at the same time in a case where the engine cooling water temperature is high and the intake temperature is low.

The engine warm-up is promoted when the center-of-gravity position of a heat generation rate is advanced by an increase in the pilot injection quantity in a case where the engine cooling water temperature is lower than a predetermined cooling water temperature and the intake temperature is equal to or lower than a predetermined intake temperature, in a case where the engine cooling water temperature is lower than a predetermined cooling water temperature and the intake temperature is higher than a predetermined intake temperature, or in a case where the engine cooling water temperature is equal to or higher than a predetermined cooling water temperature and the intake temperature is equal to or higher than a predetermined intake temperature. Accordingly, the engine warm-up is promoted and the accidental fire is inhibited from occurring at the same time.

It is preferable that the reference position is a fixed crank angle or a crank angle within a fixed range not depending on an engine load, not depending on an engine rotational speed, or not depending on either of the engine load or the engine rotational speed in a case where at least the engine load is within a predetermined range.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 1:
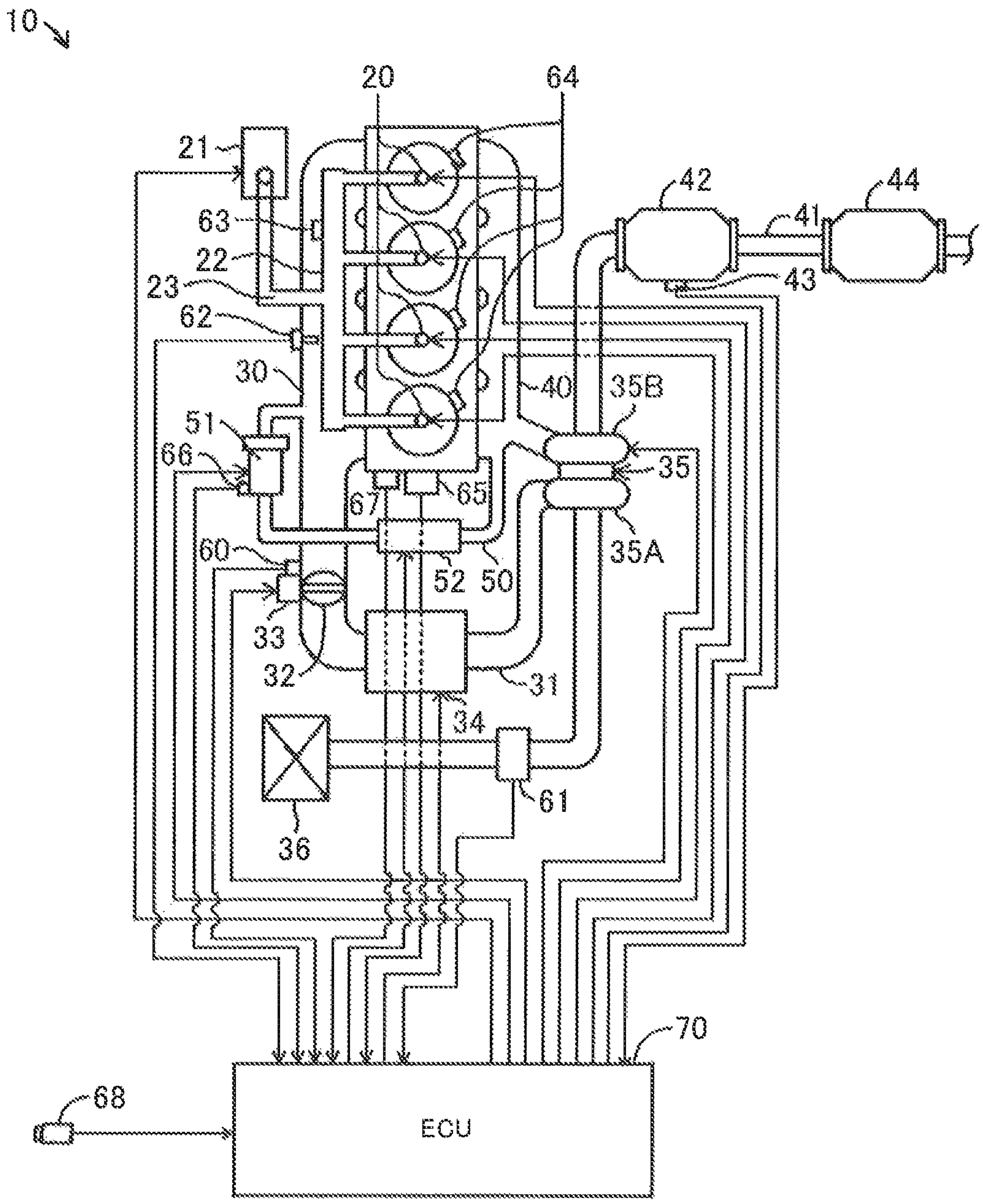
FIG. 1 illustrates an internal combustion engine that is provided with a control device according to a first embodiment.

Hereinafter, embodiments of the invention will be described with reference to accompanying drawings. FIG. 1 illustrates an internal combustion engine according to a first embodiment that is provided with a control device according to the invention. This internal combustion engine is a compression self-ignition and multi-cylinder internal combustion engine (so-called diesel engine). The internal combustion engine according to the first embodiment is an internal combustion engine that has four cylinders (combustion chambers).

In FIG. 1, 10 represents the internal combustion engine (hereinafter, referred to as an "engine"), 20 represents fuel injection valves, 21 represents a fuel pump, 22 represents an accumulator (common rail), 23 represents a fuel supply pipe, 30 represents an intake manifold, 31 represents an intake pipe, 32 represents a throttle valve, 33 represents a throttle valve actuator, 34 represents an intercooler, 35 represents a turbocharger, 35A represents a compressor of the turbocharger, 35B represents a turbine of the turbocharger, 36 represents an air cleaner, 40 represents an exhaust manifold, 41 represents an exhaust pipe, 42 represents an exhaust gas purification catalyst (hereinafter, referred to as a "catalyst"), 43 represents a catalyst temperature sensor, 44 represents a diesel particulate filter (DPF), 50 represents an EGR pipe, 51 represents an EGR valve, 52 represents an EGR cooler, 60 represents a throttle valve opening degree sensor, 61 represents an air flow meter, 62 represents an intake pressure sensor, 63 represents a fuel pressure sensor, 64 represents an in-cylinder pressure sensor, 65 represents a crank angle sensor, 66 represents an EGR valve opening degree sensor, 67 represents a water temperature sensor, 68 represents an accelerator pedal depression amount sensor, and 70 represents an electronic control unit (hereinafter, referred to as an "ECU").

The intake manifold 30 and the intake pipe 31 constitute an intake passage. The exhaust manifold 40 and the exhaust pipe 41 constitute an exhaust passage.

<EGR Device>

The EGR pipe 50, the EGR valve 51, and the EGR cooler 52 constitute an EGR device (hereinafter, referred to as a "high-pressure EGR device"). This high-pressure EGR device is a device that introduces exhaust gas from the exhaust manifold 40 to the intake manifold 30. In other words, the high-pressure EGR device is a device that introduces exhaust gas from the exhaust passage on the upstream side of the turbine 35B to the intake passage on the downstream side of the compressor 35A.

<Fuel Injection Valve>

The fuel injection valves 20 are attached to the engine 10, in relation to the respective combustion chambers, so that fuel is directly injected into the combustion chambers. Accordingly, the number of the fuel injection valves 20 that the engine 10 illustrated in FIG. 1 is provided with is four.

<ECU>

The ECU 70 is electrically connected to the fuel injection valves 20, the fuel pump 21, the throttle valve actuator 33, the intercooler 34, the turbine 35B, the EGR valve 51, and the EGR cooler 52. When the engine is in operation, the ECU 70 outputs a signal for fuel injection from the fuel injection valves 20, a signal for fuel pressure control based on the control of an operation state of the fuel pump 21, a signal for the control of the opening degree of the throttle valve 32 based on the control of an operation state of the throttle valve actuator 33, a signal for the control of the cooling capacity of the intercooler 34, a signal for the control of turbocharging pressure based on the control of an operation state of a nozzle vane (not illustrated) or a turbine bypass valve (not illustrated) of the turbine 35B, a signal for the control of the opening degree of the EGR valve 51 based on the control of an operation state of the EGR valve 51, and a signal for the control of the cooling capacity of the EGR cooler 52. These signals control the fuel injection, the pressure of the fuel, the opening degree of the throttle valve 32 (eventually, EGR ratio, that is, intake amount and/or EGR amount), the cooling capacity of the intercooler 34, the turbocharging pressure, the opening degree of the EGR valve 51 (eventually, EGR ratio, that is, EGR amount and/or intake amount), and the cooling capacity of the EGR cooler 52.

The fuel pressure is the pressure of the fuel in the accumulator 22, the pressure of the fuel in the fuel supply pipe 23, or the pressure of the fuel between the accumulator 22 and the fuel injection valve (particularly, the pressure of the fuel in the fuel injection valve). In a case where a fuel injection valve to which a fuel pressure sensor is attached is used as the fuel injection valve, for example, the pressure inside the fuel injection valve can be detected by the fuel pressure sensor of the fuel injection valve. The turbocharging pressure is the pressure of the intake air that is compressed by the compressor 35A. The EGR ratio is the ratio of the EGR amount to the amount of gas that is suctioned into the combustion chamber. The intake amount is the amount of air that is auctioned into the combustion chamber. The EGR amount is the amount of EGR gas that is intake-introduced by the high-pressure EGR device. The EGR gas is exhaust gas that is intake-introduced by the high-pressure EGR device. The nozzle vane is a vane that is disposed on the upstream side of the turbine 35B. The nozzle vane can control the amount of the exhaust gas that flows into the turbine 35B when a pivoting position of the nozzle vane is controlled. The turbine bypass valve is a valve that is disposed in a bypass passage for allowing the exhaust gas to bypass the turbine 35B. The turbine bypass valve can control the amount of the exhaust gas that flows into the turbine 35B when the opening degree of the turbine bypass valve is controlled.

The catalyst temperature sensor 43, the air flow meter 61, the intake pressure sensor 62, the fuel pressure sensor 63, the in-cylinder pressure sensor 64, the crank angle sensor 65, the EGR valve opening degree sensor 66, the water temperature sensor 67, and the accelerator pedal depression amount sensor 68 are also electrically connected to the ECU 70.

The catalyst temperature sensor 43 is attached to the catalyst 42 and transmits a signal correlated with the temperature of the catalyst to the ECU 70. The ECU 70 calculates the catalyst temperature based on this signal. The air flow meter 61 transmits a signal correlated with the intake amount to the ECU 70. The ECU 70 calculates the intake amount based on this signal. The fuel pressure sensor 63 transmits a signal correlated with the fuel pressure to the ECU 70. The ECU 70 calculates injection pressure based on this signal. The in-cylinder pressure sensor 64 transmits a signal correlated with in-cylinder pressure to the ECU 70. The ECU 70 calculates a heat generation rate based on this signal. The crank angle sensor 65 transmits a signal correlated with a rotational phase of a crankshaft to the ECU 70. The ECU 70 calculates an engine rotational speed based on this signal. The EGR valve opening degree sensor 66 transmits a signal correlated with the opening degree of the EGR valve 51 to the ECU 70. The ECU 70 calculates the opening degree of the EGR valve 51 based on this signal. The water temperature sensor 67 transmits a signal correlated with an engine cooling water temperature (that is, the temperature of cooling water that cools the engine 10, hereinafter, referred to as a "cooling water temperature") to the ECU 70. The ECU 70 calculates the cooling water temperature based on this signal. The accelerator pedal depression amount sensor 68 transmits a signal correlated with an accelerator pedal depression amount to the ECU 70. The ECU 70 calculates an engine load based on this signal.

The injection pressure is the pressure of the fuel that is injected from the fuel injection valves 20. The in-cylinder pressure is gas pressure inside the combustion chamber. The heat generation rate is the rate of heat generation (that is, the amount of heat generated in the combustion chamber per unit crank angle).

The heat generation rate may be calculated based on an ion current generated as a result of combustion.

<Exhaust Gas Purification Catalyst>

The catalyst 42 functions to purify the exhaust gas of nitrogen oxide (NOx). More specifically, the catalyst 42 is an NSR catalyst (that is, NOx occlusion reduction catalyst) that occludes the NOx contained in the exhaust gas when the air-fuel ratio of the exhaust gas flowing into the catalyst 42 is leaner than a theoretical air-fuel ratio and reduction-purifies the exhaust gas of the occluded NOx and the NOx contained in the exhaust gas flowing into the catalyst 42 when the air-fuel ratio of the exhaust gas flowing into the catalyst 42 is richer than the theoretical air-fuel ratio. The catalyst 42 purifies the exhaust gas of the NOx at a purification rate that is equal to or higher than a predetermined purification rate when the temperature of the catalyst 42 is equal to or higher than a predetermined temperature.

The invention is also applicable even in a case where the catalyst is a catalyst other than the NSR catalyst. Accordingly, the catalyst 42 may be a three-way catalyst, an SCR catalyst, an oxidation catalyst, or the like. The three-way catalyst is a catalyst that functions to purify exhaust gas of NOx, carbon monoxide (CO), and unburned hydrocarbon (HC) at the same time and at a high purification rate when the air-fuel ratio of the exhaust gas flowing into the three-way catalyst is a theoretical air-fuel ratio. This three-way catalyst also purifies the exhaust gas of the NOx, CO, and HC at a purification rate that is equal to or higher than a predetermined purification rate when the temperature of the three-way catalyst is equal to or higher than a predetermined temperature. The SCR catalyst is a catalyst that functions to purify exhaust gas of NOx by using ammonia as a reducing agent. This SCR catalyst also purifies the exhaust gas of the NOx at a purification rate that is equal to or higher than a predetermined purification rate when the temperature of the SCR catalyst is equal to or higher than a predetermined temperature. The oxidation catalyst is a catalyst that purifies (oxidizes) exhaust gas of CO and HC. This oxidation catalyst also purifies the exhaust gas of the CO and HC at a purification rate that is equal to or higher than a predetermined purification rate when the temperature of the oxidation catalyst is equal to or higher than a predetermined temperature.

<DPF>

The DPF 44 is a filter that collects particulate matter (that is, minute particles such as soot) in the exhaust gas.

<Center-of-Gravity Control>

In the first embodiment, the center-of-gravity position of a heat generation rate is used as a control index. Normal center-of-gravity control, engine warm-up center-of-gravity control, and catalyst warm-up center-of-gravity control are the types of control that use the center-of-gravity position of a heat generation rate as the control index.

<Center-of-Gravity Position of Heat Generation Rate>

Figure 2:
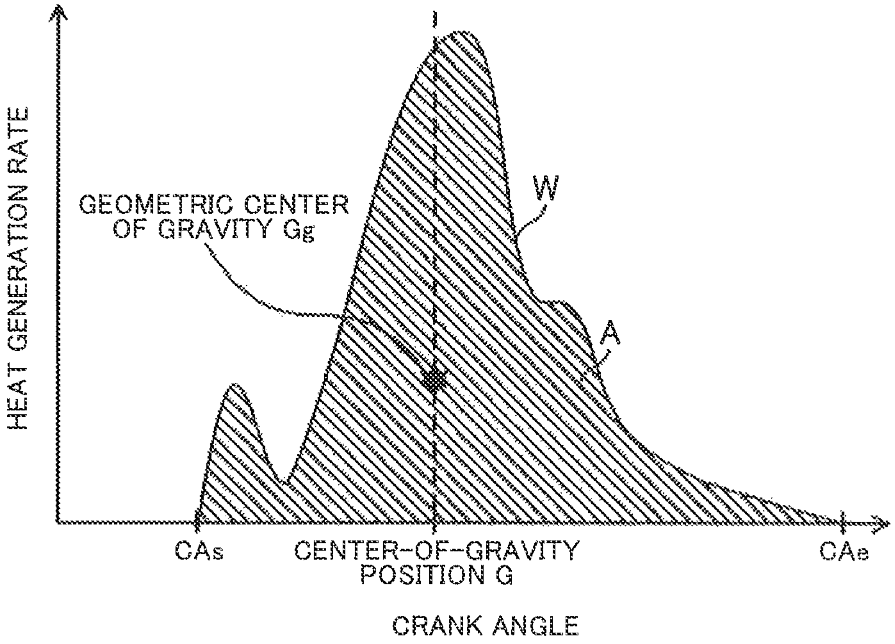
FIG. 2 is a drawing for showing the center-of-gravity position of a heat generation rate.

Hereinafter, the center-of-gravity position of a heat generation rate will be described. The center-of-gravity position of a heat generation rate means the position described below. As illustrated in FIG. 2, the center-of-gravity position of a heat generation rate G is the crank angle that corresponds to the geometric center of gravity Gg of a region A (hatched part in FIG. 2) which is defined by the waveform W of the heat generation rate with respect to the crank angle. More specifically, the center-of-gravity position of a heat generation rate is the crank angle that corresponds to the geometric center of gravity of the region which is surrounded by the waveform of the heat generation rate drawn in a coordinate system in which the horizontal axis represents the crank angle and the vertical axis represents the heat generation rate and the horizontal axis. The horizontal axis and the vertical axis are axes that are orthogonal to each other.

In other words, the center-of-gravity position of a heat generation rate is the crank angle that corresponds to the geometric center of gravity of the region which is surrounded by the waveform of the heat generation rate drawn in a graph (such as the coordinate system) in which the crank angle for each cycle is set on one axis (such as the horizontal axis) and the heat generation rate is set on the other axis (such as the vertical axis) orthogonal to the axis, and the axis. In other words, the center-of-gravity position of a heat generation rate is the crank angle that corresponds to the geometric center of gravity of the region which is defined by the waveform of the heat generation rate with respect to the crank angle.

In other words, the center-of-gravity position of a heat generation rate is a specific crank angle at which the value that is obtained by integrating the value corresponding to the product of the value obtained by subtracting the specific crank angle from an arbitrary crank angle for each cycle and the heat generation rate at the arbitrary crank angle with respect to the crank angle is 0. In other words, the center-of-gravity position of a heat generation rate is the specific crank angle G pertaining to a case where the following Equation (1) is satisfied. The specific crank angle is a crank angle between combustion initiation and combustion termination in a single expansion stroke.

$$\int_{CAs}^{CAe}(\theta-G)dQ(\theta)d\theta=0 \quad (1)$$

In other words, the center-of-gravity position of a heat generation rate is a specific crank angle pertaining to a case where the value that is obtained by integrating the product of the crank angle difference between an arbitrary crank angle which is further on an advance side than the specific crank angle and the specific crank angle, and the heat generation rate at the arbitrary crank angle with respect to the crank angle and the value that is obtained by integrating the product of the crank angle difference between an arbitrary crank angle which is further on a retard side than the specific crank angle and the specific crank angle, and the heat generation rate at the arbitrary crank angle with respect to the crank angle are equal to each other.

In other words, the center-of-gravity position of a heat generation rate is an arbitrary crank angle pertaining to a case where the total sum of the product of each heat generation rate further on the advance side than the arbitrary crank angle and the crank angle distances respectively corresponding to the heat generation rates is equal to the total sum of the product of each heat generation rate further on the retard side than the arbitrary crank angle and the crank angle distances respectively corresponding to the heat generation rates. The crank angle distance is the crank angle difference between the arbitrary crank angle and each crank angle. Accordingly, in a case where the center-of-gravity position of a heat generation rate is a fulcrum, the crank angle distance is the distance from the fulcrum, and the heat generation rate is a force, the moments (=force× distance=crank angle distance×heat generation rate) on both sides of the fulcrum are equal to each other.

In other words, the center-of-gravity position of a heat generation rate is a specific crank angle pertaining to a case where the value that is obtained by integrating the product of the "magnitude of the difference between an arbitrary first crank angle past the combustion initiation and the specific crank angle" and the "heat generation rate at the arbitrary first crank angle" with respect to the crank angle from the combustion initiation to the specific crank angle is equal to the value that is obtained by integrating the product of the "magnitude of the difference between an arbitrary second crank angle past the specific crank angle and the specific crank angle", and the "heat generation rate at the arbitrary second crank angle" with respect to the crank angle from the specific crank angle to the combustion termination.

In other words, the center-of-gravity position of a heat generation rate is the specific crank angle G pertaining to a case where the following Equation (2) is satisfied. In the following Equation (2), "CAs" represents a "combustion initiation crank angle (that is, crank angle at which the combustion begins)", "CAe" represents a "combustion termination crank angle (that is, crank angle at which the combustion terminates)", "θ" represents the "arbitrary crank angle", and "dQ(θ)" represents the "heat generation rate at the arbitrary crank angle". The specific crank angle is a crank angle between combustion initiation and combustion termination in a single expansion stroke.

$$\int_{CAs}^{Gc}(G-\theta)dQ(\theta)d\theta=\int_{Gc}^{CAe}(\theta-G)dQ(\theta)d\theta \quad (2)$$

In other words, the center-of-gravity position of a heat generation rate is the center-of-gravity position of a heat generation rate G that is acquired by a calculation based on the following Equation (3) when the crank angle at which the combustion of the fuel begins is expressed as CAs, the crank angle at which the combustion terminates is expressed as CAe, the arbitrary crank angle is expressed as θ, and the heat generation rate at the crank angle θ is expressed as dQ(θ) for each cycle.

$$G=\frac{\int_{CAs}^{CAe}(\theta-CAs)\,dQ(\theta)d\theta}{\int_{CAs}^{CAe}dQ(\theta)d\theta}+CAs \quad (3)$$

In other words, the center-of-gravity position of a heat generation rate is the value that is obtained by adding the combustion initiation crank angle to the value that is obtained by dividing the integral value of the product of the difference between the arbitrary crank angle and the combustion initiation crank angle, and the heat generation rate at the arbitrary crank angle with respect to the crank angle by the area of the region defined by the waveform of the heat generation rate with respect to the crank angle.

In other words, the center-of-gravity position of a heat generation rate is the value that is obtained by adding the combustion initiation crank angle to the value that is obtained by dividing the integral value of the product of the crank angle distance and the heat generation rate corresponding thereto with respect to the crank angle by the area of the region defined by the waveform of the heat generation rate with respect to the crank angle. The crank angle distance is the crank angle difference between the combustion initiation crank angle and each crank angle.

For reference, the heat generation rate dQG at the center-of-gravity position of a heat generation rate can be calculated based on the following Equation (4)

$$dQg = \frac{\int_{CAs}^{CAe} dQ^2(\theta)d\theta}{\int_{CAs}^{CAe} dQ(\theta)d\theta} \quad (4)$$

<Combustion Initiation Timing and Combustion Termination Timing>

In a case where it is impossible to be aware of an exact combustion initiation crank angle, a crank angle that is sure to be further on the advance side than the combustion initiation crank angle may be adopted as the combustion initiation crank angle. Likewise, in a case where it is impossible to be aware of an exact combustion termination crank angle, a crank angle that is sure to be further on the retard side than the combustion termination crank angle may be adopted as the combustion termination crank angle.

In this regard, the combustion that is taken into account during the calculation of the center-of-gravity position of a heat generation rate according to the first embodiment is the combustion of pilot fuel, main fuel, and after-fuel, and the combustion of post fuel is not taken into account during the calculation of the center-of-gravity position of a heat generation rate. Main injection is fuel injection that is performed at a timing in the vicinity of a compression top dead center. Pilot injection is fuel injection that is performed prior to the main injection and is fuel injection that is performed at least at a timing when torque is generated. After-injection is fuel injection that is performed after the main injection so that the temperature of the exhaust gas is increased and the catalyst 42 is activated, and is fuel injection that is performed at least at a timing when the torque is generated. Post injection is fuel injection that is performed after the after-injection. More specifically, the post injection is fuel injection that is performed behind 90° past the compression top dead center. The combustion of the fuel that is injected by the post injection does not result in torque generation.

20° ahead of the compression top dead center or the like may be adopted as the combustion initiation crank angle in a case where it is impossible to be aware of an exact combustion initiation crank angle. 90° past the compression top dead center or the like may be adopted as the combustion termination crank angle in a case where it is impossible to be aware of an exact combustion termination crank angle.

<Normal Center-of-Gravity Control>

Hereinafter, normal center-of-gravity control according to the first embodiment will be described. The normal center-of-gravity control according to the first embodiment is executed when the catalyst temperature is equal to or higher than a reference catalyst temperature in a case where the cooling water temperature is equal to or higher than a reference cooling water temperature or in a case where the engine is provided with the exhaust gas purification catalyst. During the normal center-of-gravity control, the value of an engine control parameter (described later) is controlled so that the center-of-gravity position of a heat generation rate corresponds to a reference position (=optimal crank angle). The value of the engine control parameter is controlled so that a required output (that is, output required for the engine) is output from the engine at the same time.

<Effect of Normal Center-of-Gravity Control>

The normal center-of-gravity control results in a reduction in fuel consumption. In addition, the control index for achieving the combustion state with the minimum fuel consumption is the single index of the center-of-gravity position of a heat generation rate, and thus the value of the engine control parameter that allows the combustion state with the minimum fuel consumption to be achieved can be determined with a low and appropriate level of workload even in a case where multiple engine control parameters are present.

The reference position is a fixed crank angle not depending on the engine load, not depending on the engine rotational speed, or not depending on either of the engine load or the engine rotational speed in a case where at least the engine load is within a predetermined range. Accordingly, dining the normal center-of-gravity control, the center-of-gravity position of a heat generation rate is controlled to correspond to the fixed crank angle, not depending on the engine load, not depending on the engine rotational speed, or not depending on either of the engine load or the engine rotational speed. The reference position is, for example, 7° past the compression top dead center. Fuel consumption is minimized when the center-of-gravity position of a heat generation rate is controlled to correspond to the reference position, and thus it can be said that the reference position is the crank angle at which the total sum of cooling loss and exhaust loss is minimized.

The normal center-of-gravity control is executed when neither the engine warm-up center-of-gravity control (described later) nor the catalyst warm-up center-of-gravity control (described later) is executed, that is, when neither engine warm-up nor catalyst warm-up is required. In addition, the normal center-of-gravity control may be executed regardless of a load, that is, in every load region or may be executed only in a case where the load is within a predetermined range. In addition, the normal center-of-gravity control may be executed with regard to only one of the combustion chambers, may be executed with regard to some of the combustion chambers, or may be executed with regard to all the combustion chambers. In a case where the normal center-of-gravity control is executed with regard to all the combustion chambers, the effect of the reduction in fuel consumption is more enhanced.

In addition, the normal center-of-gravity control may be control for controlling the center-of-gravity position of a heat generation rate to correspond to the reference position by feedback control or may be control for controlling the center-of-gravity position of a heat generation rate to correspond to the reference position by feedforward control.

<Normal Center-of-Gravity Control by Feedback Control>

Hereinafter, the normal center-of-gravity control by feedback control will be described. In this case, the reference position is obtained in advance through an experiment or the like and the obtained reference position is stored in the ECU 70. During the execution of the normal center-of-gravity control, the reference position that is stored in the ECU 70 is set to a target position. Then, the actual center-of-gravity position of a heat generation rate is calculated, and the center-of-gravity position of a heat generation rate is retarded when the calculated center-of-gravity position of a heat generation rate is at a crank angle that is further on the advance side than the target position (or when the calculated center-of-gravity position of a heat generation rate is at a crank angle that is further on the advance side than the target position by a margin of at least a predetermined angle).

The center-of-gravity position of a heat generation rate is advanced when the calculated center-of-gravity position of a heat generation rate is at a crank angle that is further on the retard side than the target position (or when the calculated center-of-gravity position of a heat generation rate is at a crank angle that is further on the retard side than the target position by a margin of at least a predetermined angle). In this manner, the center-of-gravity position of a heat generation rate is feedback-controlled to correspond to the target position (or the center-of-gravity position of a heat generation rate is feedback-controlled to approach the target position).

<Effect of Feedback Control>

In this case, the combustion state (that is, the value of the engine control parameter) is controlled, so that the center-of-gravity position of a heat generation rate corresponds to the target position, even in a case where information relating to the optimal combination of various engine control parameters for each engine operation state obtained in advance through an experiment or the like is not maintained or even in the event of an individual difference or a time-dependent change regarding the engine. As a result, a reduction in fuel consumption can be ensured.

<Advancing Means for Center-of-Gravity Position of Heat Generation Rate>

One or more of a main injection timing, a pilot injection timing, a main injection quantity pertaining to a case where the pilot injection is entailed, a pilot injection quantity, an after-injection quantity, the injection pressure, the turbocharging pressure, the intercooler cooling capacity, the EGR cooler cooling capacity, swirl intensity, tumble strength, and the like can be adopted as the engine control parameter for controlling the center-of-gravity position of a heat generation rate (that is, combustion control parameter for controlling the combustion state). The intercooler cooling capacity can be controlled based on, for example, whether or not a cooling medium is allowed to bypass a heat exchanger of the intercooler or a change in the ratio of the cooling medium that passes through the heat exchanger. Likewise, the EGR cooler cooling capacity can be controlled based on, for example, the execution or non-execution of control for allowing the cooling medium to bypass a heat exchanger of the EGR cooler or a change in the ratio of the cooling medium that passes through the heat exchanger.

One or more of the advancing of the main injection timing, the advancing of the pilot injection timing, a decrease in the main injection quantity pertaining to a case where the pilot injection is entailed, an increase in the pilot injection quantity, a combination between an increase in the pilot injection quantity and a decrease in the main injection quantity, a decrease in the after-injection quantity, an increase in the injection pressure, an increase in the turbocharging pressure, a reduction in the intercooler cooling capacity (such as the execution of the control for allowing the cooling medium to bypass the heat exchanger of the intercooler and a reduction in the ratio of the cooling medium that passes through the heat exchanger), a reduction in the EGR cooler cooling capacity (such as the execution of the control for allowing the cooling medium to bypass the heat exchanger of the EGR cooler and a reduction in the ratio of the cooling medium that passes through the heat exchanger), an increase in the swirl intensity, an increase in the tumble strength, and the like can be adopted as advancing means for the center-of-gravity position of a heat generation rate (that is, means for advancing the center-of-gravity position of a heat generation rate).

An increase in the pilot injection quantity is achieved by, for example, an increase in unit pilot injection quantity and the addition of new pilot injection (that is, an increase in the number of pilot injections). An increase in the after-injection quantity is achieved by, for example, an increase in unit after-injection quantity and the addition of new after-injection (that is, an increase in the number of after-injections).

The center-of-gravity position of a pilot heat generation rate can also be adopted as the engine control parameter. The center-of-gravity position of a pilot heat generation rate is the crank angle that corresponds to the geometric center of gravity of a region which is defined by the waveform of a pilot heat generation rate with respect to the crank angle. The pilot heat generation rate is a heat generation rate pertaining to the combustion of the fuel that is injected by the pilot injection.

One or more of the advancing of the pilot injection timing, an increase in the number of the pilot injections ahead of the current center-of-gravity position of a pilot heat generation rate, and a decrease in the number of the pilot injections behind the current center-of-gravity position of a pilot heat generation rate can be adopted as means for advancing the center-of-gravity position of a pilot heat generation rate.

The injection quantity is the quantity of the fuel that is injected from the fuel injection valve. A swirl is the flow of gas that revolves in the combustion chamber substantially about the central axis of a cylinder bore. A tumble is the flow of gas that revolves in the combustion chamber substantially about a line perpendicular to the central axis of the cylinder bore.

The EGR ratio (or the EGR amount) can also be adopted as the engine control parameter. In a case where the cooling water temperature is lower than a predetermined cooling water temperature (described in detail later) or in a case where the intake temperature is higher than a predetermined intake temperature (described in detail later), a reduction in the EGR ratio can be adopted as the advancing means for the center-of-gravity position of a heat generation rate. In a case where the cooling water temperature is equal to or higher than the predetermined cooling water temperature and the intake temperature is equal to or lower than the predetermined intake temperature, an increase in the EGR ratio can be adopted as the advancing means for the center-of-gravity position of a heat generation rate. The intake temperature is the temperature of the gas that flows into the combustion chamber. The intake temperature is, for example, the temperature of the gas inside the intake manifold 30.

Figure 3:
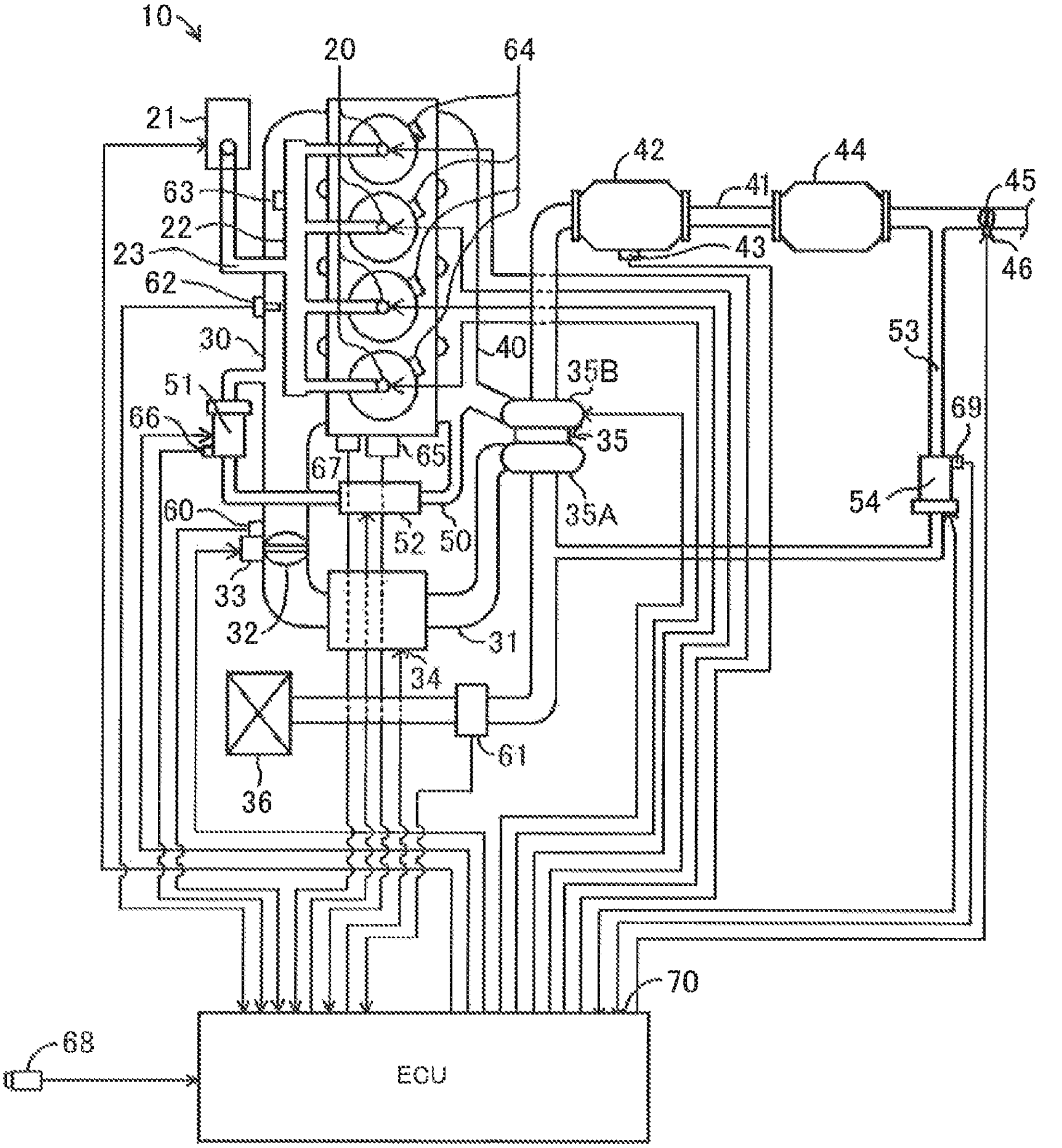
FIG. 3 illustrates another internal combustion engine that is provided with the control device according to the first embodiment.

One or more of a total EGR ratio (or a total EGR amount), a high-pressure EGR ratio (or a high-pressure EGR amount), and a low-pressure EGR ratio (or a low-pressure EGR amount) can be adopted as the engine control parameter in a case where the engine 10 is provided with an EGR device that introduces exhaust gas from the exhaust passage on the downstream side of the DPF 44 to the intake passage on the upstream side of the compressor 35A (hereinafter, referred to as a "low-pressure EGR device") as illustrated in FIG. 3. One or more of a reduction in the total EGR rate, a reduction in the high-pressure EGR ratio, and an increase in the low-pressure EGR ratio can be adopted as the advancing means for the center-of-gravity position of a heat generation rate in a case where the cooling water temperature is lower than a predetermined cooling water temperature or in a case where the cooling water temperature is higher than a predetermined cooling water temperature. An increase in the total EGR rate, an increase in the high-pressure EGR ratio, and a reduction in the low-pressure EGR ratio can be adopted as the advancing means for the center-of-gravity position of a heat generation rate in a case where the cooling water temperature is equal to or higher than the predetermined cooling water temperature and the intake temperature is equal to or lower than the predetermined intake temperature.

In the engine 10 that is illustrated in FIG. 3, the total EGR rate is the ratio of the EGR amount to the amount of the gas that is suctioned into the combustion chamber, the high-pressure EGR ratio is the ratio of the high-pressure EGR amount to the total EGR amount, the total EGR amount is the total amount of the EGR gas that is suctioned into the combustion chamber, the high-pressure EGR amount is the amount of the EGR gas that is intake-introduced by the high-pressure EGR device, the low-pressure EGR ratio is the ratio of the low-pressure EGR amount to the total EGR amount, and the low-pressure EGR amount is the amount of the EGR gas that is intake-introduced by the low-pressure EGR device.

In FIG. 3, 45 represents an exhaust throttle valve, 46 represents an exhaust throttle valve actuator, 53 represents an EGR pipe, 54 represents an EGR valve, and 69 represents an EGR valve opening degree sensor. The ECU 70 is electrically connected to the exhaust throttle valve actuator 46 and the EGR valve 54. The ECU 70 outputs a signal for the control of the opening degree of the EGR valve 54 based on the control of an operation state of the EGR valve 54. The opening degree of the EGR valve 54 (eventually, low-pressure EGR ratio and total EGR rate) is controlled by this signal. In addition, the ECU 70 outputs a signal for the control of the opening degree of the exhaust throttle valve 45 based on the control of an operation state of the exhaust throttle valve actuator 46. The opening degree of the exhaust throttle valve 45 (eventually, low-pressure EGR ratio and total EGR rate) is controlled by this signal. The EGR valve opening degree sensor 69 is electrically connected to the ECU 70. The EGR valve opening degree sensor 69 transmits a signal correlated with the opening degree of the EGR valve 54 to the ECU 70. The ECU 70 calculates the opening degree of the EGR valve 54 based on this signal. The rest of the configuration of the engine that is illustrated in FIG. 3 is identical to the configuration of the engine that is illustrated in FIG. 1.

<Retarding Means for Center-of-Gravity Position of Heat Generation Rate>

The retarding of the main injection timing, the retarding of the pilot injection timing, an increase in the main injection quantity pertaining to a case where the pilot injection is entailed, a decrease in the pilot injection quantity, a combination between a decrease in the pilot injection quantity and an increase in the main injection quantity, an increase in the after-injection quantity, a reduction in the injection pressure, a reduction in the turbocharging pressure, an increase in the intercooler cooling capacity (such as the stopping of the control for allowing the cooling medium to bypass the heat exchanger of the intercooler and an increase in the ratio of the cooling medium that passes through the heat exchanger), an increase in the EGR cooler cooling capacity (such as the stopping of the control for allowing the cooling medium to bypass the heat exchanger of the EGR cooler and an increase in the ratio of the cooling medium that passes through the heat exchanger), a reduction in the swirl intensity, a reduction in the tumble strength, and the like can be adopted as retarding means for the center-of-gravity position of a heat generation rate (that is, means for retarding the center-of-gravity position of a heat generation rate).

A decrease in the pilot injection quantity is achieved by, for example, a decrease in the unit pilot injection quantity in a case where the number of the pilot injections is fixed, by the omission of some of the pilot injections (that is, a decrease in the number of the pilot injections) in a case where the pilot injection is performed a plurality of times, by the stopping of the pilot injection, and the like.

The center-of-gravity position of a pilot heat generation rate can also be adopted as the engine control parameter. One or more of the retarding of the pilot injection timing, a decrease in the number of the pilot injections ahead of the current center-of-gravity position of a pilot heat generation rate, and an increase in the number of the pilot injections behind the current center-of-gravity position of a pilot heat generation rate can be adopted as means for retarding the center-of-gravity position of a pilot heat generation rate.

An increase in the EGR ratio can be adopted as the retarding means for the center-of-gravity position of a heat generation rate in a case where the cooling water temperature is equal to or higher than a predetermined cooling water temperature and the intake temperature is lower than a predetermined intake temperature (the predetermined cooling water temperature and the predetermined intake temperature being described in detail later), in a case where the cooling water temperature is lower than the predetermined cooling water temperature and the intake temperature is equal to or higher than the predetermined intake temperature, or in a case where the cooling water temperature is lower than the predetermined cooling water temperature and the intake temperature is lower than the predetermined intake temperature. A reduction in the EGR ratio can be adopted as the retarding means for the center-of-gravity position of a heat generation rate in a case where the cooling water temperature is equal to or higher than the predetermined cooling water temperature and the intake temperature is equal to or lower than the predetermined intake temperature.

In the engine that is illustrated in FIG. 3, an increase in the total EGR rate, an increase in the high-pressure EGR ratio, and a reduction in the low-pressure EGR ratio can be adopted as the retarding means for the center-of-gravity position of a heat generation rate in a case where the cooling water temperature is equal to or higher than a predetermined cooling water temperature and the intake temperature is lower than a predetermined intake temperature, in a case where the cooling water temperature is lower than the predetermined cooling water temperature and the intake temperature is equal to or higher than the predetermined intake temperature, or in a case where the cooling water temperature is lower than the predetermined cooling water temperature and the intake temperature is lower than the predetermined intake temperature. A reduction in the total EGR rate, a reduction in the high-pressure EGR ratio, and an increase in the low-pressure EGR ratio can be adopted as the retarding means for the center-of-gravity position of a heat generation rate in a case where the cooling water temperature is equal to or higher than the predetermined cooling water temperature and the intake temperature is equal to or lower than the predetermined intake temperature.

<Normal Center-of-Gravity Control by Feedforward Control>

Hereinafter, the normal center-of-gravity control by feedforward control will be described. In this case, the reference position is obtained in advance through an experiment or the like. The value of at least one engine control parameter (or a combination of the values of a plurality of the engine control parameters) that allows this reference position to be achieved for each engine operation state is obtained in advance, as a reference value, through an experiment or the like. Then, this reference value (or these reference values) is stored in the ECU 70 in the form of a map of a function of the engine operation state. Then, during the normal center-of-gravity control, the reference value that is correlated with the engine operation state is calculated from the map and the calculated reference value is set to a target value. Then, the values of the respective engine control parameters are controlled to correspond to the correlated target values. In this manner, the center-of-gravity position of a heat generation rate is controlled to correspond to the reference position.

In this case, the engine control parameters may be feedback-controlled so that the values of the engine control parameters correspond to the respective target values.

Even when the value of the engine control parameter is maintained at the target value, the center-of-gravity position of a heat generation rate is more retarded as the engine rotational speed increases and the center-of-gravity position of a heat generation rate is more advanced as the engine rotational speed decreases.

During the normal center-of-gravity control by feedforward control, the target value of the main injection timing may be advanced, the target value of the pilot injection timing may be advanced, the target value of the main injection quantity may be decreased, the target value of the pilot injection quantity may be increased, the target value of the after-injection quantity may be decreased, the target value of the injection pressure may be increased, the target value of the turbocharging pressure may be increased, the target value of the intercooler cooling capacity may be decreased, the target value of the EGR cooler cooling capacity may be decreased, the target value of the swirl intensity may be increased, and the target value of the tumble strength may be increased as the engine rotational speed increases.

During the normal center-of-gravity control by feedforward control, the target value of the EGR ratio may be increased, the target value of the total EGR rate may be increased, the target value of the high-pressure EGR ratio may be increased, and the target value of the low-pressure EGR ratio may be decreased as the engine rotational speed increases in a case where the cooling water temperature is equal to or higher than a predetermined cooling water temperature and the intake temperature is lower than a predetermined intake temperature, in a case where the cooling water temperature is lower than the predetermined cooling water temperature and the intake temperature is equal to or higher than the predetermined intake temperature, or in a case where the cooling water temperature is lower than the predetermined cooling water temperature and the intake temperature is lower than the predetermined intake temperature. During the normal center-of-gravity control by feedforward control, the target value of the total EGR rate may be decreased, the target value of the high-pressure EGR ratio may be decreased, and the target value of the low-pressure EGR ratio may be increased as the engine rotational speed increases in a case where the cooling water temperature is equal to or higher than the predetermined cooling water temperature and the intake temperature is equal to or lower than the predetermined intake temperature.

<Engine Warm-Up Center-of-Gravity Control According to First Embodiment>

Hereinafter, the engine warm-up center-of-gravity control according to the first embodiment will be described. During the engine warm-up center-of-gravity control, the center-of-gravity position of a heat generation rate is controlled to correspond to an advance position (that is, a crank angle further on the advance side than the reference position). In other words, the center-of-gravity position of a heat generation rate is further advanced than the reference position. The engine warm-up center-of-gravity control is executed in a case where the engine cooling water temperature (that is, the temperature of the cooling water for cooling the internal combustion engine, hereinafter, simply referred to as the "cooling water temperature") is lower than the reference cooling water temperature. The engine warm-up center-of-gravity control is terminated at a point in time when the cooling water temperature becomes equal to or higher than the reference cooling water temperature. Then, the normal center-of-gravity control is executed.

<Effect of Engine Warm-Up Center-of-Gravity Control According to First Embodiment>

According to the engine warm-up center-of-gravity control of the first embodiment, the center-of-gravity position of a heat generation rate is further advanced than the reference position in a case where the cooling water temperature is lower than the reference cooling water temperature. In a case where the center-of-gravity position of a heat generation rate is a crank angle that is further on the advance side than the reference position, the cooling loss is greater than in a case where the center-of-gravity position of a heat generation rate is the reference position. Accordingly, the amount of heat that is transferred to the main body of the engine from the inside of the combustion chamber increases, and thus the temperature of the engine (that is, the temperature of the engine main body, the temperature of the engine main body around the combustion chamber in particular) can be raised.

As described above, the engine temperature can be raised by the engine warm-up center-of-gravity control. Accordingly, the engine can be warmed up quickly, which is an advantageous effect, when the reference cooling water temperature is set for the execution of the engine warm-up center-of-gravity control in a case where the engine warm-up is required due to a low engine temperature. In this case, an engine warm-up completion temperature is set as the reference cooling water temperature. The engine warm-up completion temperature is a temperature that is determined in advance as a threshold which allows a determination that the engine warm-up is completed.

In a case where the engine warm-up completion temperature is set as the reference cooling water temperature, it can be said that the engine warm-up center-of-gravity control is initiated at a point in time when the engine warm-up is required (that is, a point in time when it is detected that the cooling water temperature is lower than the engine warm-up completion temperature) and is terminated at a point in time when the engine warm-up is completed (that is, a point in time when it is detected that the cooling water temperature is equal to or higher than the engine warm-up completion temperature).

In other words, the engine warm-up center-of-gravity control is initiated at a point in time when an engine warm-up request condition is satisfied (that is, a point in time when it is detected that the cooling water temperature is lower than the engine warm-up completion temperature) and is terminated at a point in time when an engine warm-up completion condition is satisfied (that is, a point in time when it is detected that the cooling water temperature is equal to or higher than the engine warm-up completion temperature). In this case, the engine warm-up request condition is not satisfied at the point in time when the engine warm-up completion condition is satisfied. In other words, the engine warm-up center-of-gravity control is executed while the engine warm-up is required or while the engine warm-up request condition is satisfied.

Figure 4:
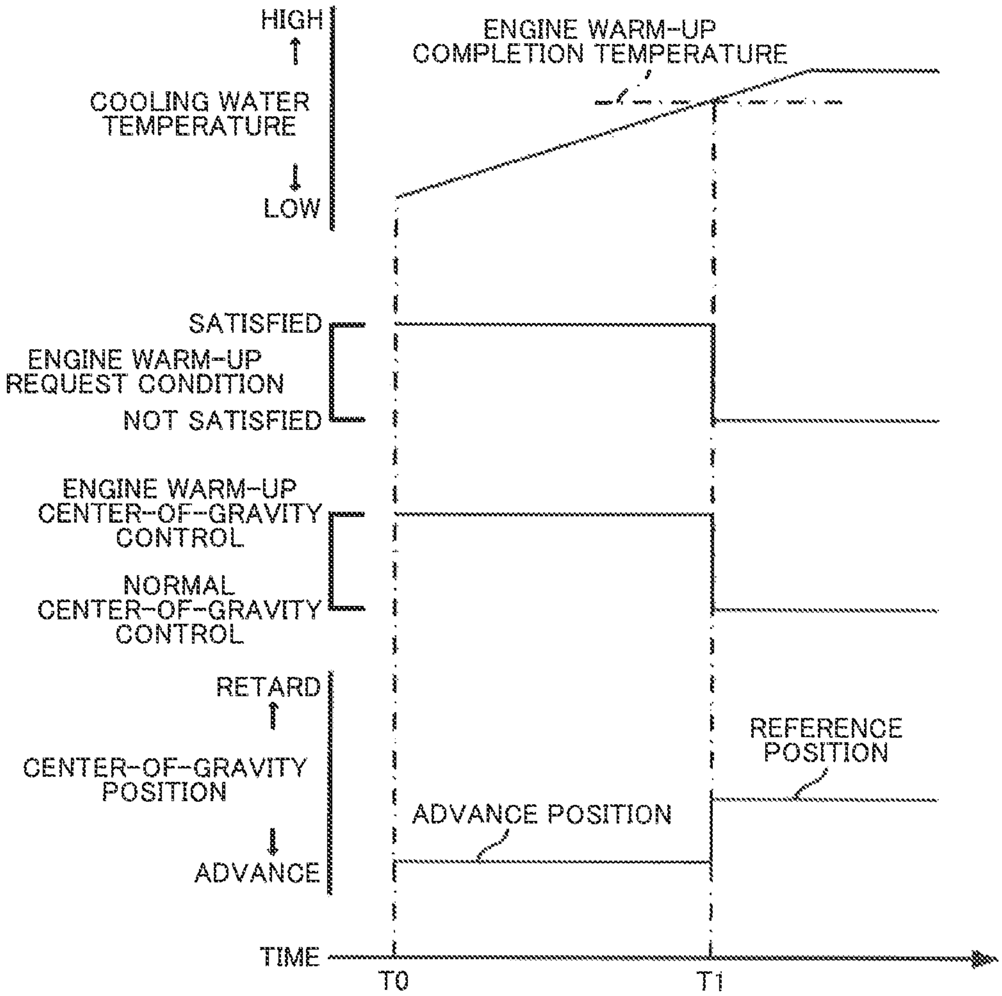
FIG. 4 illustrates a time chart for showing engine warm-up center-of-gravity control according to the first embodiment.

In this case, the normal center-of-gravity control and the engine warm-up center-of-gravity control are executed as illustrated in, for example, FIG. 4. In other words, the engine warm-up request condition is satisfied when it is detected at time T0 that the cooling water temperature is lower than the engine warm-up completion temperature (=reference cooling water temperature). Then, the engine warm-up center-of-gravity control is executed and the center-of-gravity position of a heat generation rate is further advanced than the reference position. The engine warm-up request condition is not satisfied when it is detected at time T1 that the cooling water temperature is equal to the engine warm-up completion temperature. Then, the engine warm-up center-of-gravity control is terminated, the normal center-of-gravity control is executed, and the center-of-gravity position of a heat generation rate is controlled to correspond to the reference position.

The cooling water temperature is used in the engine warm-up center-of-gravity control described above. This cooling water temperature is a parameter representative of the engine temperature, and thus the engine temperature itself may be used instead of the cooling water temperature. Likewise, a parameter other than the cooling water temperature that has a correlation with the engine temperature (such as the temperature of lubricating oil for the engine) may be used instead.

<Setting of Advance Position>

Figure 5A:
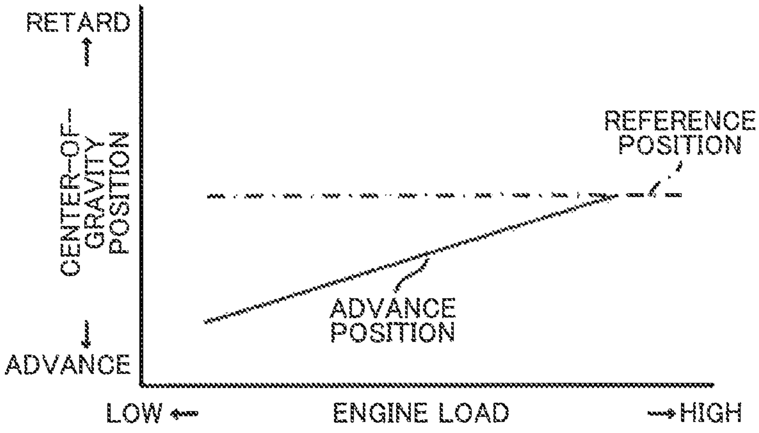
FIG. 5A shows a relationship between an engine load and an advance position and FIG. 5B shows a relationship between the engine load and a retard position.

The advance position is not limited to the specific crank angle. In the first embodiment, for example, the advance position is set to a crank angle that is on the side further advanced as the engine load decreases as illustrated in FIG. 5A. In other words, the advance position corresponding to a relatively lower engine load is a crank angle that is on the side further advanced than the advance position corresponding to a relatively higher engine load. The advance position may also be set to a crank angle that is on the side further advanced as the engine rotational speed decreases. As a matter of course, the advance position may also be set to a fixed crank angle regardless of the engine load.

The following effects are achieved in a case where the advance position is set to the crank angle that is on the side further advanced as the engine load decreases. The heating value of a single expansion stroke decreases as the engine load decreases, and thus the amount of heat transfer to the engine (that is, the amount of heat that is transferred from the inside of the combustion chamber to the engine main body per unit time) decreases. As the center-of-gravity position of a heat generation rate is more advanced than the reference position, the cooling loss increases and the amount of heat transfer to the engine increases. Accordingly, the center-of-gravity position of a heat generation rate is more advanced than the reference position in a case where the advance position is set to the crank angle that is on the side further advanced as the engine load decreases, and thus the amount of heat transfer to the engine increases. As a result, the engine can be warmed up quickly.

The following effects are achieved in a case where the advance position is set to the crank angle that is on the side further advanced as the engine rotational speed decreases. The amount of heat transfer to the engine decreases as the engine rotational speed decreases. As the center-of-gravity position of a heat generation rate is more advanced than the reference position, the cooling loss increases. Accordingly, the center-of-gravity position of a heat generation rate is more advanced than the reference position in a case where the advance position is set to the crank angle that is on the side further advanced as the engine rotational speed decreases, and thus the amount of heat transfer to the engine increases. As a result, the engine can be warmed up quickly.

Although the advance position may be set in all engine load regions, the advance position may also be set only in a region where the engine load is lower than a predetermined load. In this case, the center-of-gravity position of a heat generation rate is controlled to correspond to the reference position when the engine load is equal to or higher than a predetermined load during the engine warm-up center-of-gravity control. In other words, the engine warm-up center-of-gravity control is not executed (that is, the engine warm-up request condition is not satisfied) in practice and the normal center-of-gravity control is executed in a case where the engine load is equal to or higher than a predetermined load.

The setting of the advance position only in the region where the engine load is lower than a predetermined load is preferable in that an early warm-up of the engine can be ensured and a reduction in fuel consumption can be achieved at the same time. In other words, the in-cylinder heating value itself is high in a case where the engine load is high, and thus the amount of heat transfer to the engine is large even at a constant cooling loss. Accordingly, the engine can be sufficiently warmed up even without the center-of-gravity position of a heat generation rate being further retarded than the reference position while resorting to a reduction in fuel consumption. Accordingly, it can be said that the setting of the advance position only in the region where the engine load is lower than a predetermined load is preferable in view of ensuring the early warm-up of the engine and achieving a reduction in fuel consumption at the same time.

The engine warm-up center-of-gravity control may be control for controlling the center-of-gravity position of a heat generation rate to correspond to the advance position by feedback control. The engine warm-up center-of-gravity control may also be control for controlling the center-of-gravity position of a heat generation rate to correspond to the advance position by feedforward control.

<Engine Warm-Up Center-of-Gravity Control by Feedback Control>

Hereinafter, the engine warm-up center-of-gravity control by feedback control will be described. In this case, the advance position is obtained in advance through an experiment or the like and the obtained advance position is stored in the ECU 70. During the execution of the engine warm-up center-of-gravity control, the advance position that is stored in the ECU 70 is set to a target position. Then, the actual center-of-gravity position of a heat generation rate is calculated, and the center-of-gravity position of a heat generation rate is retarded when the calculated center-of-gravity position of a heat generation rate is at a crank angle that is further on the advance side than the target position. The center-of-gravity position of a heat generation rate is advanced when the calculated center-of-gravity position of a heat generation rate is at a crank angle that is further on the retard side than the target position. In this manner, the center-of-gravity position of a heat generation rate is feedback-controlled to correspond to the target position (that is, the advance position).

One or more of the engine control parameters described with regard to the normal center-of-gravity control can be adopted as the engine control parameter regarding the engine warm-up center-of-gravity control by feedback control.

<Engine Warm-Up Center-of-Gravity Control by Feedforward Control>

Hereinafter, the engine warm-up center-of-gravity control by feedforward control will be described. In this case, the advance position is obtained in advance through an experiment or the like. The value of at least one engine control parameter (or a combination of the values of a plurality of the engine control parameters) that allows this advance position to be achieved is obtained in advance, as a reference advance value, through an experiment or the like. Then, this reference advance value (or these reference advance values) is stored in the ECU 70. Then, during the engine warm-up center-of-gravity control, the reference advance value that is stored in the ECU 70 is set to a target value. Then, the values of the respective engine control parameters are controlled to correspond to the correlated target values. In this manner, the center-of-gravity position of a heat generation rate is controlled to correspond to the advance position.

In this case, the engine control parameters may be feedback-controlled so that the values of the engine control parameters correspond to the respective target values. One or more of the engine control parameters described with regard to the normal center-of-gravity control can be adopted as the engine control parameter regarding the engine warm-up center-of-gravity control by feedforward control.

<Catalyst Warm-Up Center-of-Gravity Control According to First Embodiment>

Hereinafter, the catalyst warm-up center-of-gravity control according to the first embodiment will be described. During the catalyst warm-up center-of-gravity control, the center-of-gravity position of a heat generation rate is controlled to correspond to a retard position (that is, a crank angle further on the retard side than the reference position). In other words, the center-of-gravity position of a heat generation rate is further retarded than the reference position. The catalyst warm-up center-of-gravity control is executed in a case where the catalyst temperature is lower than the reference catalyst temperature. The catalyst warm-up center-of-gravity control is terminated at a point in time when the catalyst temperature becomes equal to or higher than the reference catalyst temperature. Then, the normal center-of-gravity control is executed.

<Effect of Catalyst Warm-Up Center-of-Gravity Control According to First Embodiment>

According to the catalyst warm-up center-of-gravity control of the first embodiment, the center-of-gravity position of a heat generation rate is further retarded than the reference position in a case where the catalyst temperature is lower than the reference catalyst temperature. In a case where the center-of-gravity position of a heat generation rate is a crank angle that is further on the retard side than the reference position, the exhaust loss is greater than in a case where the center-of-gravity position of a heat generation rate is the reference position. Accordingly, the temperature of the exhaust gas that flows into the catalyst increases, and thus the catalyst temperature can be raised.

As described above, the catalyst temperature can be raised by the catalyst warm-up center-of-gravity control. Accordingly, the catalyst can be warmed up quickly, which is an advantageous effect, when the reference catalyst temperature is set for the execution of the catalyst warm-up center-of-gravity control in a case where the catalyst warm-up is required due to a low catalyst temperature. In this case, a catalyst warm-up completion temperature is set as the reference catalyst temperature. The catalyst warm-up completion temperature is a temperature that is determined in advance as a threshold which allows a determination that the catalyst warm-up is completed. For example, the catalyst warm-up completion temperature is the activation temperature of the exhaust gas purification catalyst (that is, the catalyst temperature pertaining to a case where the purification performance of the exhaust gas purification catalyst exceeds a predetermined performance).

In a case where the catalyst warm-up completion temperature is set as the reference catalyst temperature, it can be said that the catalyst warm-up center-of-gravity control is initiated at a point in time when the catalyst warm-up is required (that is, a point in time when it is detected that the catalyst temperature is lower than the catalyst warm-up completion temperature) and is terminated at a point in time when the catalyst warm-up is completed (that is, a point in time when it is detected that the catalyst temperature is equal to or higher than the catalyst warm-up completion temperature).

In other words, the catalyst warm-up center-of-gravity control is initiated at a point in time when a catalyst warm-up request condition is satisfied (that is, a point in time when it is detected that the catalyst temperature is lower than the catalyst warm-up completion temperature) and is terminated at a point in time when a catalyst warm-up completion condition is satisfied (that is, a point in time when it is detected that the catalyst temperature is equal to or higher than the catalyst warm-up completion temperature). In this case, the catalyst warm-up request condition is not satisfied at the point in time when the catalyst warm-up completion condition is satisfied. In other words, the catalyst warm-up center-of-gravity control is executed while the catalyst warm-up is required or while the catalyst warm-up request condition is satisfied.

Figure 6:
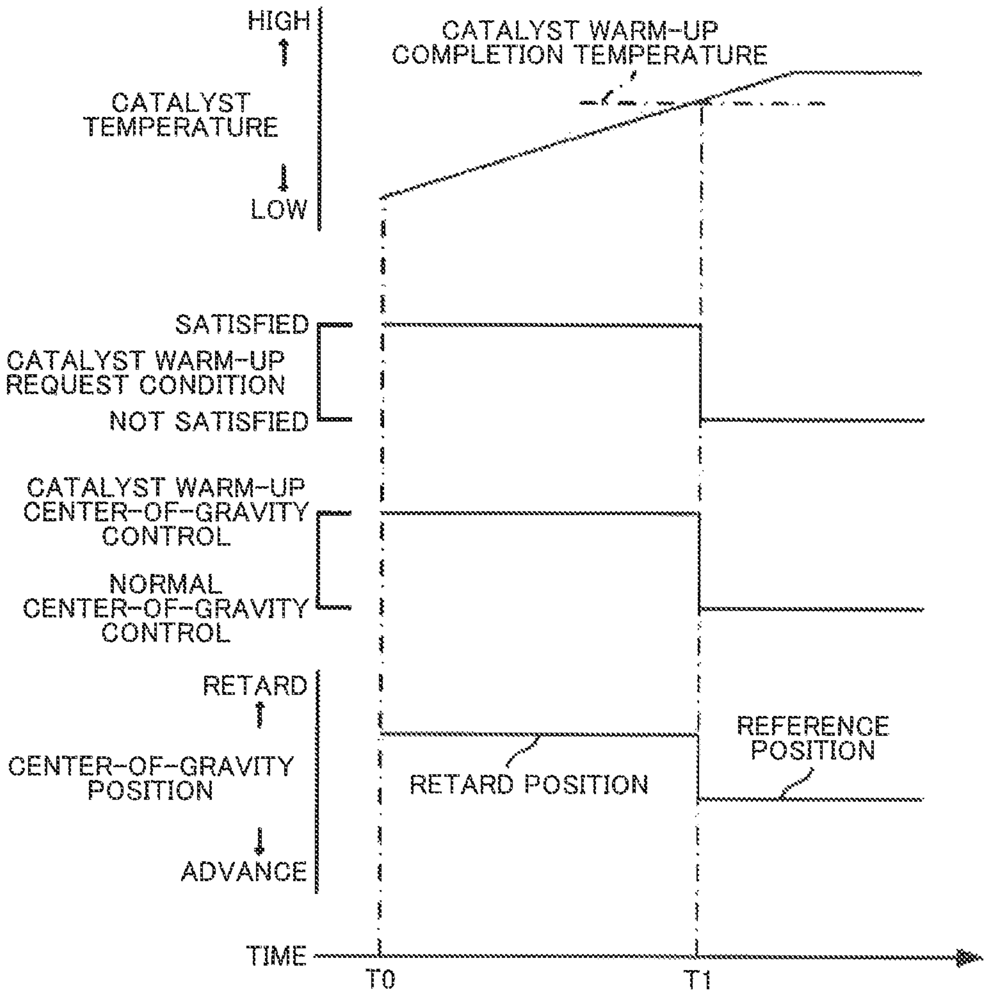
FIG. 6 illustrates a time chart for showing catalyst warm-up center-of-gravity control according to the first embodiment.

In this case, the normal center-of-gravity control and the catalyst warm-up center-of-gravity control are executed as illustrated in, for example, FIG. 6. In other words, the catalyst warm-up request condition is satisfied when it is detected at time T0 that the catalyst temperature is lower than the catalyst warm-up completion temperature (=reference catalyst temperature). Then, the catalyst warm-up center-of-gravity control is executed and the center-of-gravity position of a heat generation rate is further retarded than the reference position. The catalyst warm-up request condition is not satisfied when it is detected at time T1 that the catalyst temperature is equal to the catalyst warm-up completion temperature. Then, the catalyst warm-up center-of-gravity control is terminated, the normal center-of-gravity control is executed, and the center-of-gravity position of a heat generation rate is controlled to correspond to the reference position.

The catalyst temperature may a catalyst temperature that is calculated based on the signal from the catalyst temperature sensor 43 (that is, the temperature of the catalyst itself) or may be a catalyst temperature that is estimated from a parameter which has a correlation with the catalyst temperature. Alternatively, the parameter that has a correlation with the catalyst temperature may be used instead of the catalyst temperature.

<Setting of Retard Position>

Figure 5B:
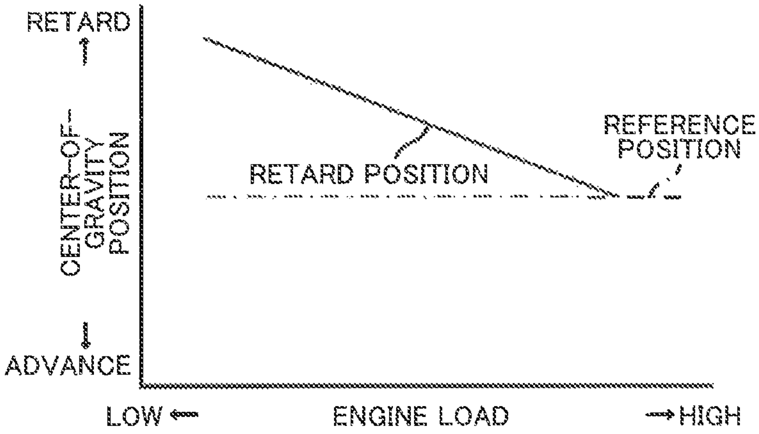

The retard position is not limited to a specific angle. In the first embodiment, for example, the retard position is set to a crank angle that is on the side further retarded as the engine load decreases as illustrated in FIG. 5B. In other words, the retard position corresponding to a relatively lower engine load is a crank angle that is on the side further retarded than the retard position corresponding to a relatively higher engine load. The retard position may also be set to a crank angle that is on the side further retarded as the engine rotational speed decreases. As a matter of course, the retard position may also be set to a fixed crank angle regardless of the engine load.

The following effects are achieved in a case where the retard position is set to the crank angle that is on the side further retarded as the engine load decreases. The heating value of a single expansion stroke decreases as the engine load decreases, and thus the amount of heat transfer on the exhaust gas (that is, the amount of heat that is transferred on the exhaust gas and to the catalyst per unit time) decreases. As the center-of-gravity position of a heat generation rate is more retarded than the reference position, the exhaust loss increases and the amount of heat transfer on the exhaust gas increases. Accordingly, the center-of-gravity position of a heat generation rate is more retarded than the reference position in a case where the retard position is set to the crank angle that is on the side further retarded as the engine load decreases, and thus the amount of heat transfer on the exhaust gas increases. As a result, the catalyst can be warmed up quickly.

The following effects are achieved in a case where the retard position is set to the crank angle that is on the side further retarded as the engine rotational speed decreases. The amount of heat transfer on the exhaust gas decreases as the engine rotational speed decreases. As the center-of-gravity position of a heat generation rate is more retarded than the reference position, the exhaust loss increases. Accordingly, the center-of-gravity position of a heat generation rate is more retarded than the reference position in a case where the retard position is set to the crank angle that is on the side further retarded as the engine rotational speed decreases, and thus the amount of heat transfer on the exhaust gas increases. As a result, the catalyst can be warmed up quickly.

Although the retard position may be set in all engine load regions, the retard position may also be set only in a region where the engine load is lower than a predetermined load. In this case, the center-of-gravity position of a heat generation rate is controlled to correspond to the reference position when the engine load is equal to or higher than a predetermined load during the catalyst warm-up center-of-gravity control. In other words, the catalyst warm-up center-of-gravity control is not executed (that is, the catalyst warm-up request condition is not satisfied) in practice and the normal center-of-gravity control is executed in a case where the engine load is equal to or higher than a predetermined load.

The setting of the retard position only in the region where the engine load is lower than a predetermined load is preferable in that an early warm-up of the catalyst can be ensured and a reduction in fuel consumption can be achieved at the same time. In other words, the in-cylinder heating value itself is high in a case where the engine load is high, and thus the temperature of the exhaust gas is high even at a constant exhaust loss. Accordingly, the catalyst can be sufficiently warmed up even without the center-of-gravity position of a heat generation rate being further retarded than the reference position while resorting to a reduction in fuel consumption. Accordingly, it can be said that the setting of the retard position only in the region where the engine load is lower than a predetermined load is preferable in view of ensuring the early warm-up of the catalyst and achieving a reduction in fuel consumption at the same time.

The catalyst warm-up center-of-gravity control may be control for controlling the center-of-gravity position of a heat generation rate to correspond to the retard position by feedback control. The catalyst warm-up center-of-gravity control may also be control for controlling the center-of-gravity position of a heat generation rate to correspond to the retard position by feedforward control.

<Catalyst Warm-Up Center-of-Gravity Control by Feedback Control>

Hereinafter, the catalyst warm-up center-of-gravity control by feedback control will be described. In this case, the retard position is obtained in advance through an experiment or the like and the obtained retard position is stored in the ECU 70. During the execution of the catalyst warm-up center-of-gravity control, the retard position that is stored in the ECU 70 is set to a target position. Then, the actual center-of-gravity position of a heat generation rate is calculated, and the center-of-gravity position of a heat generation rate is retarded when the calculated center-of-gravity position of a heat generation rate is at a crank angle that is further on the advance side than the target position. The center-of-gravity position of a heat generation rate is advanced when the calculated center-of-gravity position of a heat generation rate is at a crank angle that is further on the retard side than the target position. In this manner, the center-of-gravity position of a heat generation rate is feedback-controlled to correspond to the target position (that is, the retard position).

One or more of the engine control parameters described with regard to the normal center-of-gravity control can be adopted as the engine control parameter regarding the catalyst warm-up center-of-gravity control by feedback control.

<Catalyst Warm-Up Center-of-Gravity Control by Feedforward Control>

Hereinafter, the catalyst warm-up center-of-gravity control by feedforward control will be described. In this case, the retard position is obtained in advance through an experiment or the like. The value of at least one engine control parameter (or a combination of the values of a plurality of the engine control parameters) that allows this retard position to be achieved is obtained in advance, as a reference retard value, through an experiment or the like. Then, this reference retard value (or these reference retard values) is stored in the ECU 70. Then, during the catalyst warm-up center-of-gravity control, the reference retard value that is stored in the ECU 70 is set to a target value. Then, the values of the respective engine control parameters are controlled to correspond to the correlated target values. In this manner, the center-of-gravity position of a heat generation rate is controlled to correspond to the retard position.

In this case, the engine control parameters may be feedback-controlled so that the values of the engine control parameters correspond to the respective target values. One or more of the engine control parameters described with regard to the normal center-of-gravity control can be adopted as the engine control parameter regarding the catalyst warm-up center-of-gravity control by feedforward control.

<Engine Warm-Up Request and Catalyst Warm-Up Request>

When both the engine warm-up request condition and the catalyst warm-up request condition are satisfied, the engine warm-up center-of-gravity control is executed in a case where, for example, the engine temperature difference (that is, the difference of the engine temperature at that time with respect to the engine warm-up completion temperature) exceeds the catalyst temperature difference (that is, the difference of the catalyst temperature at that time with respect to the catalyst warm-up completion temperature) and the catalyst warm-up center-of-gravity control is executed in a case where, for example, the catalyst temperature difference is equal to or greater than the engine temperature difference. Alternatively, the catalyst warm-up center-of-gravity control may be executed in a case where the concentration of a component that is contained in the exhaust gas which the exhaust gas purification catalyst should purify (such as NOx concentration, CO concentration, and HC concentration) is higher than a predetermined concentration and the engine warm-up center-of-gravity control may be executed in a case where the concentration of the component is equal to or lower than the predetermined concentration.

Alternatively, one of the engine warm-up center-of-gravity control and the catalyst warm-up center-of-gravity control may be executed according to a prior determination as to which one of the engine warm-up center-of-gravity control and the catalyst warm-up center-of-gravity control is to be executed when both of the conditions are satisfied.

<Center-of-Gravity Control Flow According to First Embodiment>

Figure 7:
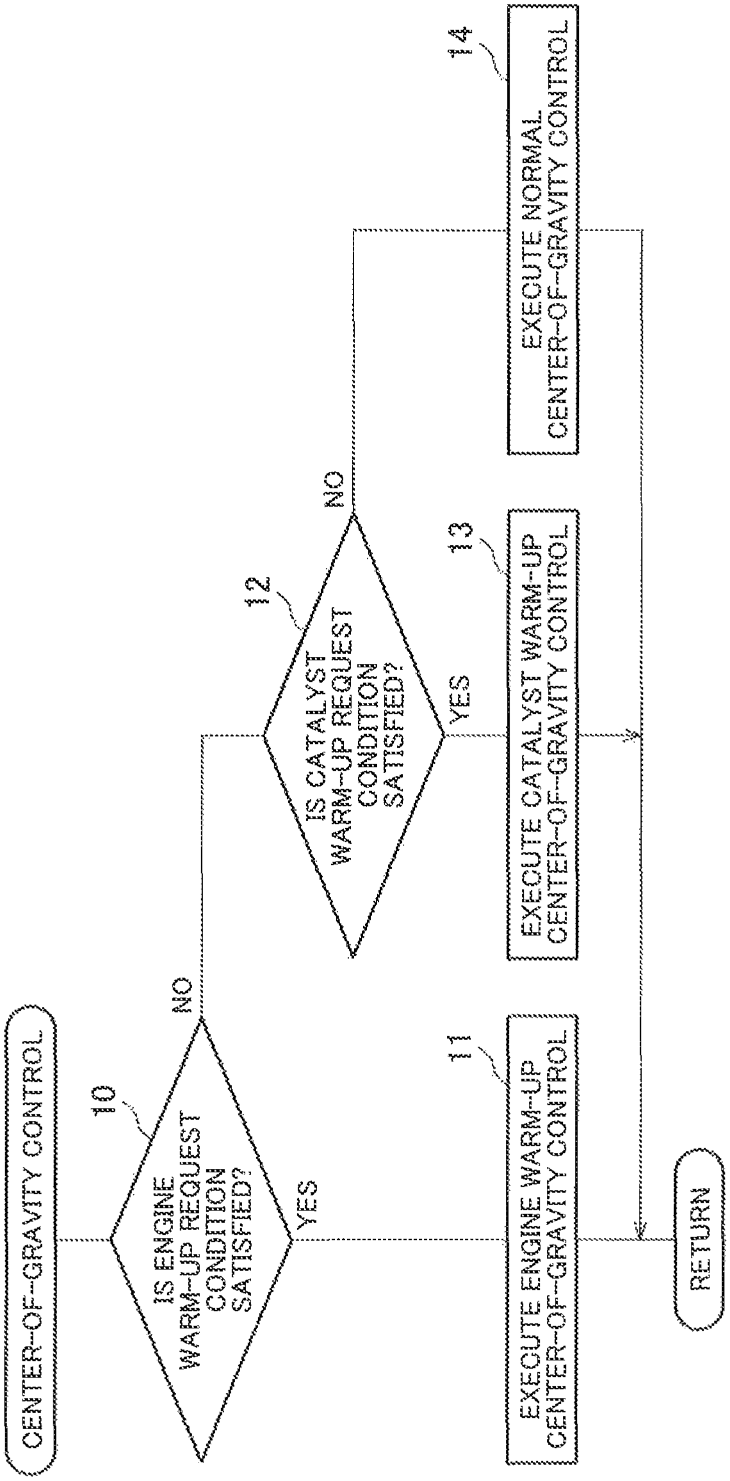
FIG. 7 illustrates an example of a center-of-gravity control flow according to the first embodiment.

Hereinafter, an example of a center-of-gravity control flow according to the first embodiment will be described. This flow is illustrated in FIG. 7. The flow that is illustrated in FIG. 7 is initiated when the start of the engine is initiated or is initiated every time a predetermined period of time elapses while the engine is in operation.

After the flow that is illustrated in FIG. 7 is initiated, it is first determined in Step 10 whether or not the engine warm-up request condition is satisfied. When it is determined that the engine warm-up request condition is satisfied, the engine warm-up center-of-gravity control is executed in Step 11, and then the flow is terminated. In other words, the center-of-gravity position of a heat generation rate is further advanced than the reference position. Then, the engine warm-up center-of-gravity control continues to be executed during the execution of the subsequent flow insofar as it is determined in Step 10 that the engine warm-up request condition is satisfied. This control is terminated in a case where the control other than the engine warm-up center-of-gravity control (that is, the normal center-of-gravity control or the catalyst warm-up center-of-gravity control) is executed during the processing of Step 11.

When it is determined in Step 10 that the engine warm-up request condition is not satisfied, it is determined in Step 12 whether or not the catalyst warm-up request condition is satisfied. When it is determined that the catalyst warm-up request condition is satisfied, the catalyst warm-up center-of-gravity control is executed in Step 13, and then the flow is terminated. In other words, the center-of-gravity position of a heat generation rate is further retarded than the reference position. Then, the catalyst warm-up center-of-gravity control continues to be executed during the execution of the subsequent flow insofar as it is determined in Step 10 that the engine warm-up request condition is not satisfied and it is determined in Step 12 that the catalyst warm-up request condition is satisfied. This control is terminated in a case where the control other than the catalyst warm-up center-of-gravity control (that is, the normal center-of-gravity control or the engine warm-up center-of-gravity control) is executed during the processing of Step 13.

When it is determined in Step 12 that the catalyst warm-up request condition is not satisfied, the normal center-of-gravity control is executed in Step 14, and then the flow is terminated. In other words, the center-of-gravity position of a heat generation rate is controlled to correspond to the reference position. Then, the normal center-of-gravity control continues to be executed during the execution of the subsequent flow insofar as it is determined in Step 10 that the engine warm-up request condition is not satisfied and it is determined in Step 12 that the catalyst warm-up request condition is not satisfied. This control is terminated in a case where the control other than the normal center-of-gravity control (that is, the engine warm-up center-of-gravity control or the catalyst warm-up center-of-gravity control) is executed during the processing of Step 14.

<Normal Center-of-Gravity Control Flow According to First Embodiment>

Figure 8:
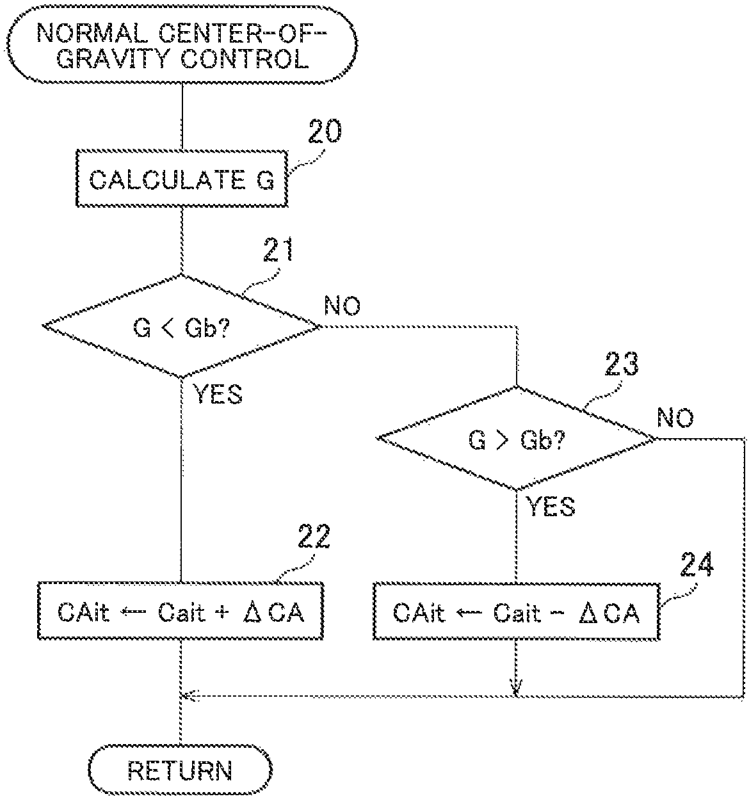
FIG. 8 illustrates an example of a normal center-of-gravity control flow according to the first embodiment.

Hereinafter, an example of a normal center-of-gravity control flow according to the first embodiment will be described. This flow is illustrated in FIG. 8. The flow that is illustrated in FIG. 8 is executed in, for example, Step 14 in FIG. 7.

After the flow that is illustrated in FIG. 8 is initiated, the center-of-gravity position of a heat generation rate G is first calculated in Step 20. A method for calculating the center-of-gravity position of a heat generation rate G is as described above. Then, in Step 21, it is determined whether or not the center-of-gravity position of a heat generation rate G that is calculated in Step 20 is less than the reference position Gb ($G<Gb$), that is, whether or not the current center-of-gravity position of a heat generation rate G is further advanced than the reference position Gb. When it is determined that G is less than Gb, the value that is obtained by adding a predetermined crank angle ΔCA to the current target injection timing CAit is set to a new target injection timing CAit in Step 22, and then the flow is terminated. In other words, the current target injection timing is retarded by a margin of a predetermined crank angle in Step 22. In this case, the fuel is injected from the fuel injection valve at the target injection timing that is set in Step 22.

When it is determined in Step 21 that G is at least Gb, it is determined in Step 23 whether or not the center-of-gravity position of a heat generation rate G that is calculated in Step 20 exceeds the reference position Gb ($G>Gb$), that is, whether or not the current center-of-gravity position of a heat generation rate G is further retarded than the reference position Gb. When it is determined that G exceeds Gb, the value that is obtained by subtracting the predetermined crank angle ΔCA from the current target injection timing CAit is set to the new target injection timing CAit in Step 23, and then the flow is terminated. In other words, the current target injection timing is advanced by a margin of a predetermined crank angle in Step 24. In this case, the fuel is injected from the fuel injection valve at the target injection timing that is set in Step 24.

The flow is terminated as it is when it is determined in Step 23 that Gb is at least G. In other words, the flow is terminated with the current target injection timing remaining unchanged in a case where the current center-of-gravity position of a heat generation rate is at the reference center of gravity. As a matter of course, the fuel is injected from the fuel injection valve at the current target injection timing in this case.

<Combustion State Control Flow According to First Embodiment>

Figure 9:
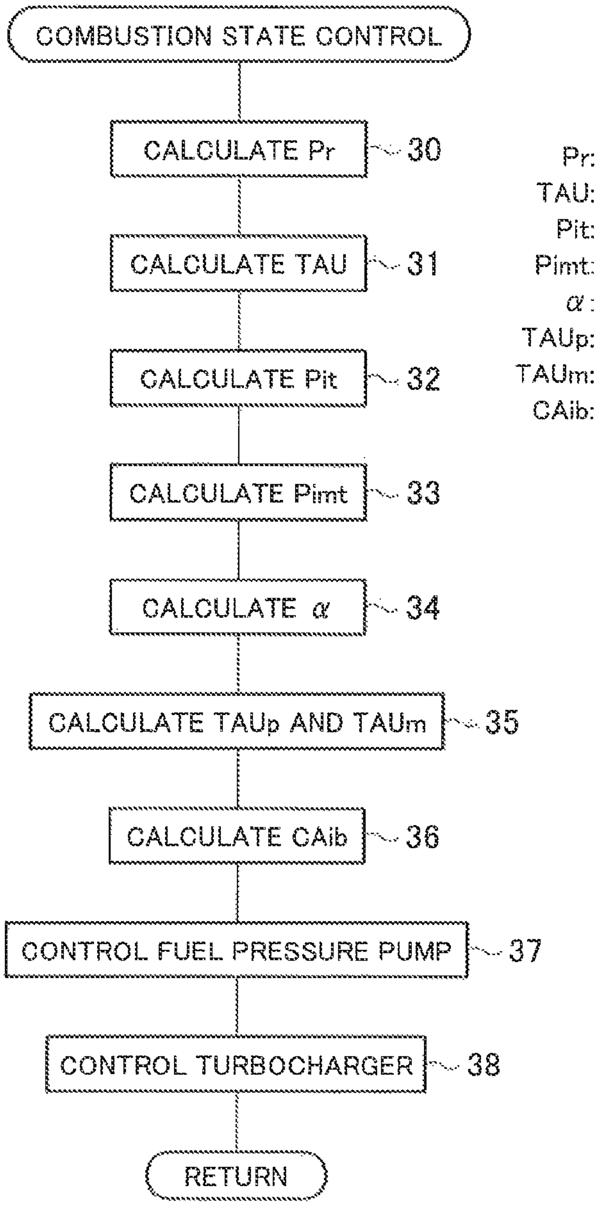
FIG. 9 illustrates an example of a combustion state control flow according to the first embodiment.

Hereinafter, an example of a combustion state control flow according to the first embodiment will be described. This flow is illustrated in FIG. 9. The flow that is illustrated in FIG. 9 is executed every time a predetermined period of time elapses while the engine is in operation. In the following description, a target output means the "target value of the output of the engine", a target injection quantity means the "target value of the amount of the fuel that is injected from the fuel injection valve", a target injection pressure means the "pressure of the fuel that is injected from the fuel injection valve", a target turbocharging pressure means the "pressure inside the intake passage on the downstream side of the compressor of the turbocharger", and a pilot injection ratio means the "ratio of the amount of the fuel that is injected by the pilot injection to the target injection quantity".

After the flow that is illustrated in FIG. 9 is initiated, the required output Pr is first calculated in Step 30 based on the accelerator pedal depression amount and the speed of the vehicle. Then, in Step 31, the target injection quantity TAU is calculated based on the required output Pr that is calculated in Step 30. Then, in Step 32, the target injection pressure Pit is calculated based on the required output Pr that is calculated in Step 30. Then, in Step 33, the target turbocharging pressure Pimt is calculated based on the required output Pr that is calculated in Step 30. Then, in Step 34, the pilot injection ratio α is calculated based on the cooling water temperature and the engine rotational speed. The pilot injection ratio α is a value that is equal to or higher than zero and is less than 1.

Then, in Step 35, the pilot injection quantity TAUp and the main injection quantity TAUm are calculated based on the target injection quantity that is calculated in Step 31 and the pilot injection ratio α that is calculated in Step 34. The pilot injection quantity TAUp is the value that is obtained by multiplying the target injection quantity TAU by the pilot injection ratio α (=TAU×α) and the main injection quantity TAUm is the value that is obtained by subtracting the pilot injection quantity from the target injection quantity TAU (=TAU−TAUp=TAU×(1−α)).

Then, in Step 36, a reference injection timing CAib is calculated based on the required output Pr, the target injection quantity TAU, the target injection pressure Pit, the target turbocharging pressure Pimt, and the pilot injection ratio α that are calculated in Step 30 to Step 34. The reference injection timing CAib is used in, for example, the setting of the target injection timing according to the flow illustrated in FIG. 8.

Then, in Step 37, an operation of a fuel pressure pump is controlled so that the injection pressure becomes the target injection pressure Pit that is calculated in Step 32. Then, in Step 38, an operation of the turbocharger is controlled so that the turbocharging pressure becomes the target turbocharging pressure Pimt that is calculated in Step 33.

Second Embodiment

Hereinafter, a second embodiment will be described. The configuration and control according to the second embodiment that are not described below are identical to the respective configuration and control according to the first embodiment or are the configuration or control that can be naturally derived from the configuration or control according to the first embodiment in view of the configuration or control according to the second embodiment described below.

In the second embodiment, the normal center-of-gravity control is executed in a case where the cooling water temperature is equal to or higher than the reference cooling water temperature. In addition, the engine warm-up center-of-gravity control is executed in a case where the cooling water temperature is lower than a center-of-gravity position switching temperature that is lower than the reference cooling water temperature. In addition, the catalyst warm-up center-of-gravity control is executed in a case where the cooling water temperature is lower than the reference cooling water temperature and is equal to or higher than the center-of-gravity position switching temperature.

Figure 10:
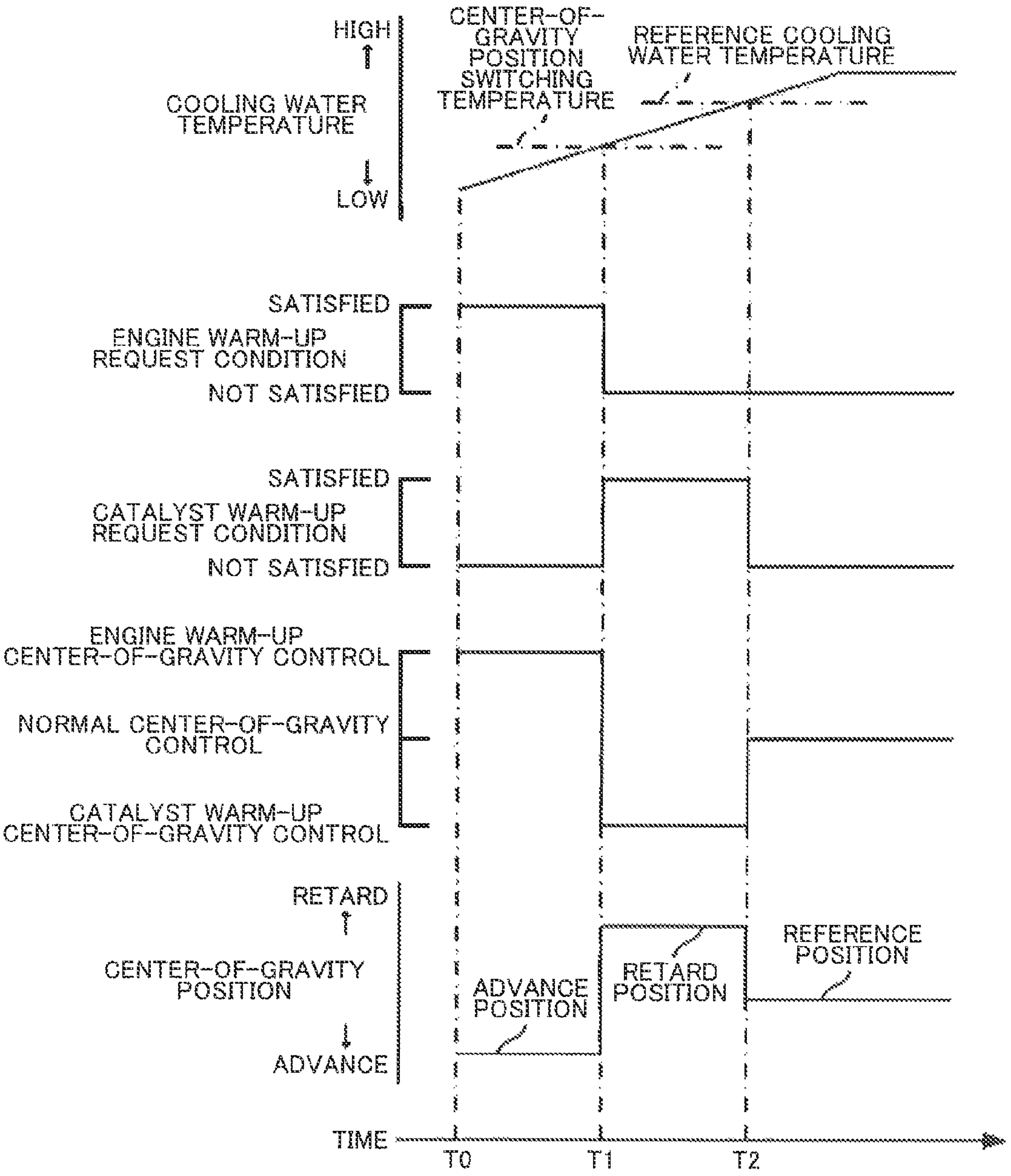
FIG. 10 illustrates a time chart for showing center-of-gravity control according to a second embodiment.

In this case, the center-of-gravity control is executed as illustrated in, for example, FIG. 10. In other words, the engine warm-up request condition is satisfied when it is detected at time T0 that the cooling water temperature is lower than the center-of-gravity position switching temperature. Then, the engine warm-up center-of-gravity control is executed and the center-of-gravity position of a heat generation rate is further advanced than the reference position. The engine warm-up request condition is not satisfied and the catalyst warm-up request condition is satisfied when it is detected at time T1 that the cooling water temperature is equal to the center-of-gravity position switching temperature. Then, the engine warm-up center-of-gravity control is terminated, the catalyst warm-up center-of-gravity control is executed, and the center-of-gravity position of a heat generation rate is further retarded than the reference position. The catalyst warm-up request condition is not satisfied when it is detected at time T2 that the cooling water temperature is equal to the reference cooling water temperature. Then, the catalyst warm-up center-of-gravity control is terminated, the normal center-of-gravity control is executed, and the center-of-gravity position of a heat generation rate is controlled to correspond to the reference position.

Effect of Second Embodiment

According to the second embodiment, the center-of-gravity position of a heat generation rate is further advanced than the reference position in a case where the cooling water temperature is extremely lower than the reference cooling water temperature (that is, in a case where the cooling water temperature is lower than the center-of-gravity position switching temperature). Accordingly, the engine temperature can be raised as described above. Accordingly, the engine temperature can be raised when the engine temperature is extremely low due to an extremely low cooling water temperature. The center-of-gravity position of a heat generation rate is further retarded than the reference position in a case where the cooling water temperature is relatively lower than the reference cooling water temperature (that is, in a case where the cooling water temperature is lower than the reference cooling water temperature and is equal to or higher than the center-of-gravity position switching temperature). Accordingly, the catalyst temperature can be raised as described above. Accordingly, the catalyst temperature can be raised when the catalyst temperature is low due to a low cooling water temperature.

<Center-of-Gravity Control Flow According to Second Embodiment>

Figure 11:
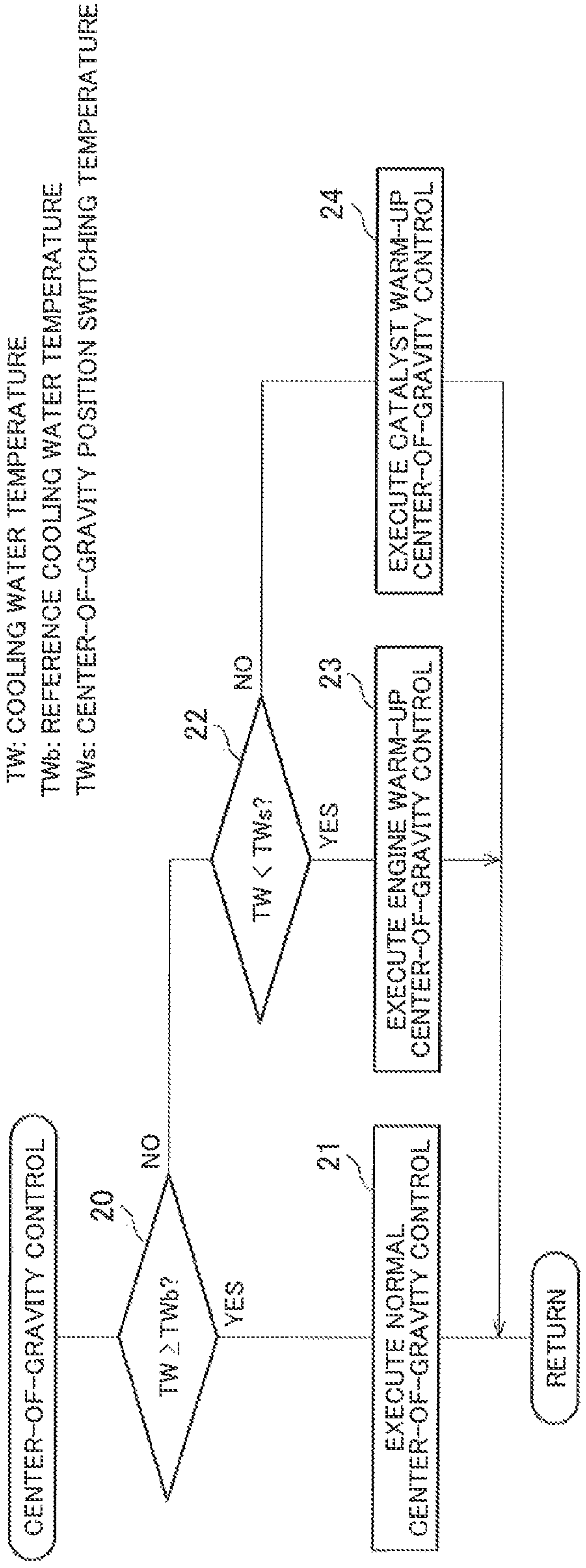
FIG. 11 illustrates an example of a center-of-gravity control flow according to the second embodiment.

Hereinafter, an example of a center-of-gravity control flow according to the second embodiment will be described. This flow is illustrated in FIG. 11. The flow that is illustrated in FIG. 11 is initiated when the start of the engine is initiated or is initiated every time a predetermined period of time elapses while the engine is in operation.

After the flow that is illustrated in FIG. 11 is initiated, it is first determined in Step 40 whether or not the cooling water temperature TW is equal to or higher than the reference cooling water temperature TWb (TW≥TWb). When it is determined that TW is equal to or higher than TWb, the normal center-of-gravity control is executed in Step 41, and then the flow is terminated. In other words, the center-of-gravity position of a heat generation rate is controlled to correspond to the reference position. Then, the normal center-of-gravity control continues to be executed during the execution of the subsequent flow insofar as it is determined in Step 40 that TW is equal to or higher than TWb. This control is terminated in a case where the control other than the normal center-of-gravity control (that is, the engine warm-up center-of-gravity control or the catalyst warm-up center-of-gravity control) is executed during the processing of Step 41.

When it is determined in Step 40 that TW is lower than TWb, it is determined in Step 42 whether or not the cooling water temperature TW is lower than the center-of-gravity position switching temperature TWs (TW<TWs). When it is determined that TW is lower than TWs, the engine warm-up center-of-gravity control is executed in Step 43, and then the flow is terminated. In other words, the center-of-gravity position of a heat generation rate is further advanced than the reference position. Then, the engine warm-up center-of-gravity control continues to be executed during the execution of the subsequent flow insofar as it is determined in Step 40 that TW is lower than TWb and it is determined in Step 42 that TWs is higher than TW. This control is terminated in a case where the control other than the engine warm-up center-of-gravity control (that is, the normal center-of-gravity control or the catalyst warm-up center-of-gravity control) is executed during the processing of Step 43.

When it is determined in Step 42 that TW is equal to or higher than TWs, the catalyst warm-up center-of-gravity control is executed in Step 44, and then the flow is terminated. In other words, the center-of-gravity position of a heat generation rate is further retarded than the reference position. Then, the catalyst warm-up center-of-gravity control continues to be executed during the execution of the subsequent flow insofar as it is determined in Step 40 that TW is lower than TWb and it is determined in Step 42 that TW is equal to or higher than TWs. This control is terminated in a case where the control other than the catalyst warm-up center-of-gravity control (that is, the normal center-of-gravity control or the engine warm-up center-of-gravity control) is executed during the processing of Step 44.

Third Embodiment

Hereinafter, a third embodiment will be described. The configuration and control according to the third embodiment that are not described below are identical to the respective configuration and control according to the above-described embodiments or are the configuration or control that can be naturally derived from the configuration or control according to the above-described embodiments in view of the configuration or control according to the third embodiment described below.

<Engine Warm-Up Center-of-Gravity Control According to Third Embodiment>

Figure 12A:
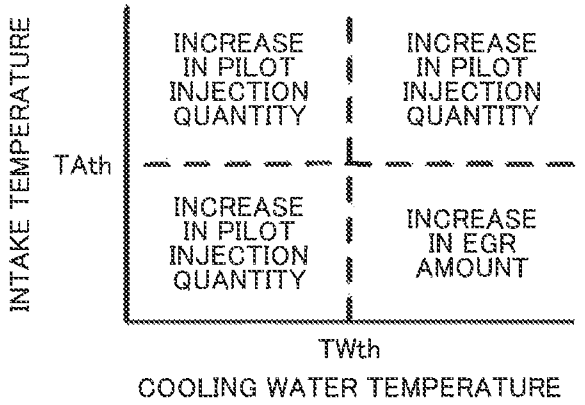
FIG. 12A is a drawing for showing an advancing method for engine warm-up center-of-gravity control according to a third embodiment and FIG. 12B is a drawing for showing a retarding method for catalyst warm-up center-of-gravity control according to the third embodiment.

Hereinafter, the engine warm-up center-of-gravity control according to the third embodiment will be described. During this control, the center-of-gravity position of a heat generation rate is controlled to correspond to the advance position (that is, a crank angle that is on the side further advanced than the reference position) by an increase in the EGR amount in a case where the cooling water temperature is equal to or higher than a predetermined cooling water temperature TWth and the intake temperature is equal to or lower than a predetermined intake temperature TAth as illustrated in FIG. 12A. In other words, the center-of-gravity position of a heat generation rate is further advanced than the reference position by an increase in the EGR amount.

The center-of-gravity position of a heat generation rate is controlled to correspond to the advance position by an increase in the pilot injection quantity in a case where the cooling water temperature is lower than the predetermined cooling water temperature TWth or in a case where the intake temperature is higher than the predetermined intake temperature TAth. In other words, the center-of-gravity position of a heat generation rate is further advanced than the reference position by an increase in the pilot injection quantity.

The predetermined cooling water temperature and the predetermined intake temperature are not particularly limited. Accordingly, the predetermined cooling water temperature and the predetermined intake temperature may differ from each other or may be equal to each other. However, a predetermined cooling water temperature is set to a temperature that is lower than at least the engine warm-up completion temperature. In addition, a predetermined cooling water temperature is set to the lower limit value of the cooling water temperature at which combustibility (that is, combustibility of the fuel inside the combustion chamber) can be improved by an increase in the EGR amount (or a temperature that is higher than the lower limit value by a margin of a predetermined temperature) at least in a case where the intake temperature is lower than a predetermined intake temperature. A predetermined intake temperature is set to the upper limit value of the intake temperature at which combustibility can be improved by an increase in the EGR amount (or a temperature that is lower than the upper limit value by a margin of a predetermined temperature) at least in a case where the cooling water temperature is equal to or higher than a predetermined cooling water temperature.

The amount of fresh air (that is, the amount of air that is suctioned into the combustion chamber) significantly decreases, even when the cooling water temperature is equal to or higher than the predetermined cooling water temperature and the intake temperature is equal to or lower than the predetermined intake temperature, in a case where the EGR amount significantly increases. Combustibility might be reduced in this case. Accordingly, during the engine warm-up center-of-gravity control according to the third embodiment, the amount of increase in the EGR amount pertaining to a case where the center-of-gravity position of a heat generation rate is advanced by an increase in the EGR amount is set to at least the upper limit value of the amount at which combustibility can be improved by an increase in the EGR amount (or the an amount that is smaller than the upper limit value by a margin of a predetermined amount).

Figure 13:
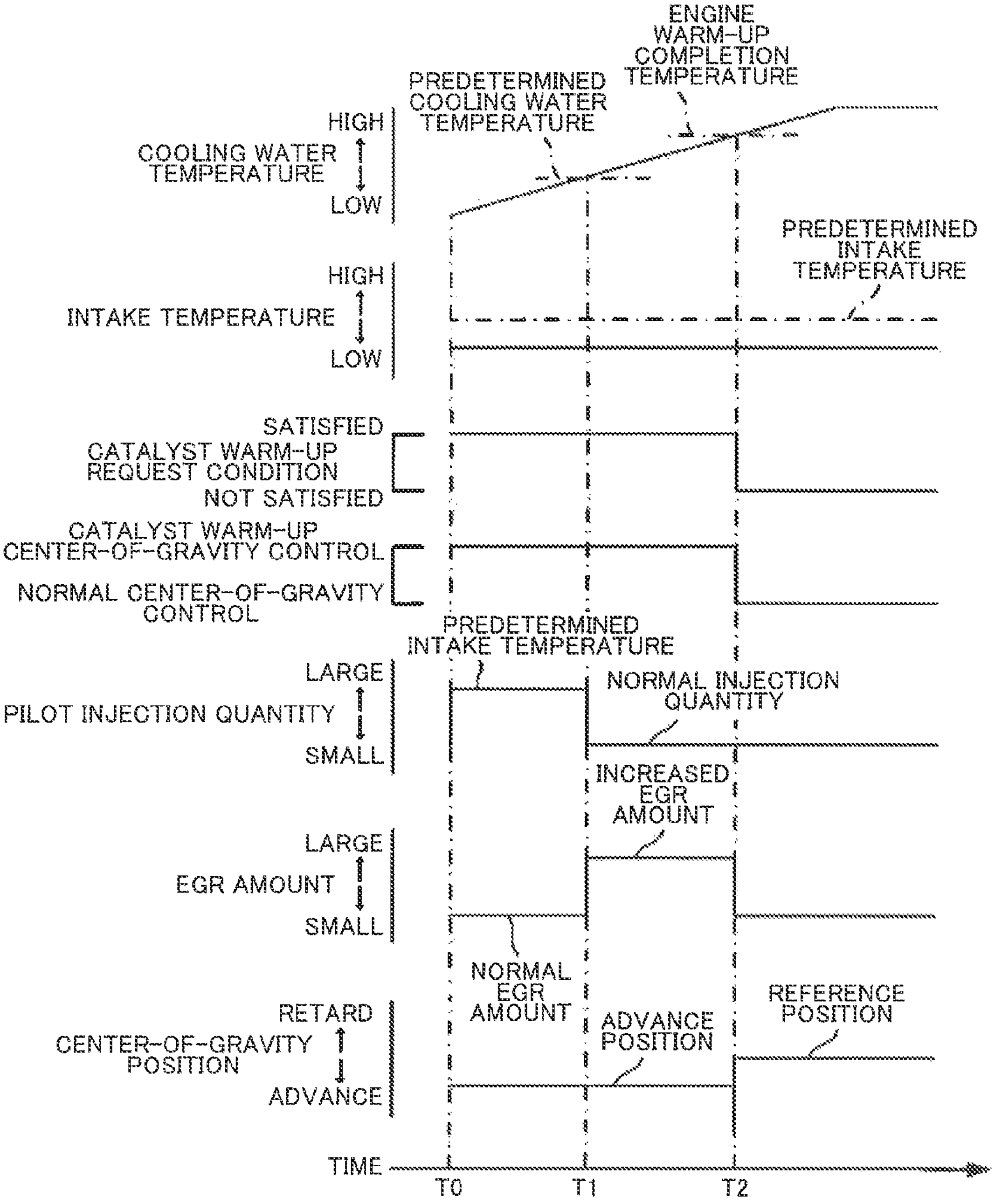
FIG. 13 illustrates a time chart for showing the engine warm-up center-of-gravity control according to the third embodiment.

According to the third embodiment, the normal center-of-gravity control and the engine warm-up center-of-gravity control are executed as illustrated in, for example, FIG. 13. In other words, the engine warm-up request condition is satisfied when it is detected at time T0 that the cooling water temperature is lower than the engine warm-up completion temperature. Then, the engine warm-up center-of-gravity control is executed. In this case, the cooling water temperature is lower than a predetermined cooling water temperature, and thus the center-of-gravity position of a heat generation rate is further advanced than the reference position by an increase in the pilot injection quantity.

When it is detected at time T1 that the cooling water temperature is equal to or higher than a predetermined cooling water temperature and the intake temperature is equal to or lower than a predetermined intake temperature, the pilot injection quantity returns to a normal injection quantity and the center-of-gravity position of a heat generation rate is further advanced than the reference position by an increase in the EGR amount. The engine warm-up request condition is not satisfied when it is detected at time T2 that the cooling water temperature is equal to the engine warm-up completion temperature. Then, the engine warm-up center-of-gravity control is terminated, the normal center-of-gravity control is executed, the EGR amount returns to a normal EGR amount, and the center-of-gravity position of a heat generation rate is controlled to correspond to the reference position.

<Effect of Engine Warm-Up Center-of-Gravity Control According to Third Embodiment>

The following effects can be achieved by the engine warm-up center-of-gravity control according to the third embodiment. The level of combustibility is low in a case where the intake temperature is low. Accordingly, in general, the intake temperature increases and combustibility is improved as the EGR amount is increased. However, combustibility is not improved when the cooling water temperature is low (that is, when the engine temperature is low) even at a high intake temperature. In other words, combustibility is improved when the EGR amount is increased in a case where the cooling water temperature is high and the intake temperature is low. According to the engine warm-up center-of-gravity control of the third embodiment, the EGR amount is increased in a case where the cooling water temperature is equal to or higher than a predetermined cooling water temperature and the intake temperature is equal to or lower than a predetermined intake temperature. Accordingly, combustibility is improved. As a result, the center-of-gravity position of a heat generation rate is advanced and the engine warm-up is promoted. In addition, the amount of NOx generation is reduced by an increase in the EGR amount. In other words, according to the engine warm-up center-of-gravity control of the third embodiment, the engine warm-up is promoted and the amount of NOx generation is reduced at the same time in a case where the cooling water temperature is high and the intake temperature is low.

Meanwhile, the level of combustibility is low when the cooling water temperature is low (that is, when the engine temperature is low) as described above. In this case, combustibility is not improved even when the intake temperature is increased by an increase in the EGR amount, and thus the advancing of the center-of-gravity position of a heat generation rate is not achieved. In addition, an accidental fire might occur when the EGR amount is increased despite a low level of combustibility. In other words, it is preferable that the center-of-gravity position of a heat generation rate is advanced by means other than an increase in the EGR amount in this case. In a case where the cooling water temperature is high (that is, in a case where the engine temperature is high) and the intake temperature is high, an increase in the EGR amount causes combustibility to be reduced because the level of combustibility is already high. As a result, the advancing of the center-of-gravity position of a heat generation rate is not achieved. In addition, an accidental fire might occur depending on the amount of increase in the EGR amount. In other words, it is preferable that the center-of-gravity position of a heat generation rate is advanced by means other than an increase in the EGR amount even in this case. According to the engine warm-up center-of-gravity control of the third embodiment, the center-of-gravity position of a heat generation rate is advanced by an increase in the pilot injection quantity and the engine warm-up is promoted in a case where the cooling water temperature is lower than a predetermined cooling water temperature and the intake temperature is equal to or lower than a predetermined intake temperature, in a case where the cooling water temperature is lower than a predetermined cooling water temperature and the intake temperature is higher than a predetermined intake temperature, or in a case where the cooling water temperature is equal to or higher than a predetermined cooling water temperature and the intake temperature is equal to or higher than a predetermined intake temperature. Accordingly, the engine warm-up is promoted and an accidental fire is inhibited from occurring at the same time.

<Catalyst Warm-Up Center-of-Gravity Control According to Third Embodiment>

Figure 12B:
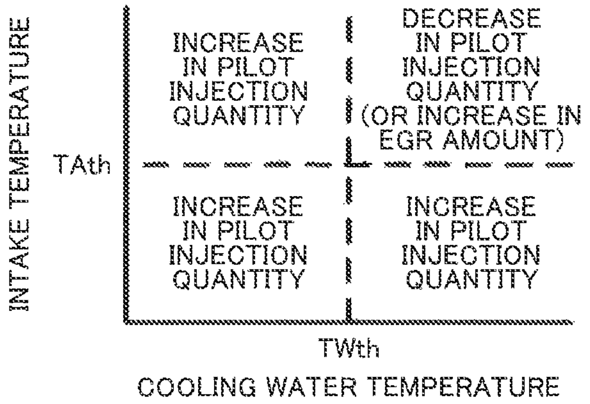

Hereinafter, the catalyst warm-up center-of-gravity control according to the third embodiment will be described. During this control, the center-of-gravity position of a heat generation rate is controlled to correspond to the retard position by a decrease in the pilot injection quantity regardless of whether or not the cooling water temperature is equal to or higher than the predetermined cooling water temperature TWth and regardless of whether or not the intake temperature is equal to or lower than the predetermined intake temperature TAth as illustrated in FIG. 12B. In other words, the center-of-gravity position of a heat generation rate is further retarded than the reference position by a decrease in the pilot injection quantity.

In the third embodiment, the center-of-gravity position of a heat generation rate may also be retarded by an increase in the EGR amount in a case where the cooling water temperature is equal to or higher than the predetermined cooling water temperature TWth and the intake temperature is equal to or higher than the predetermined intake temperature TAth.

<Center-of-Gravity Control Flow According to Third Embodiment>

Figure 14:
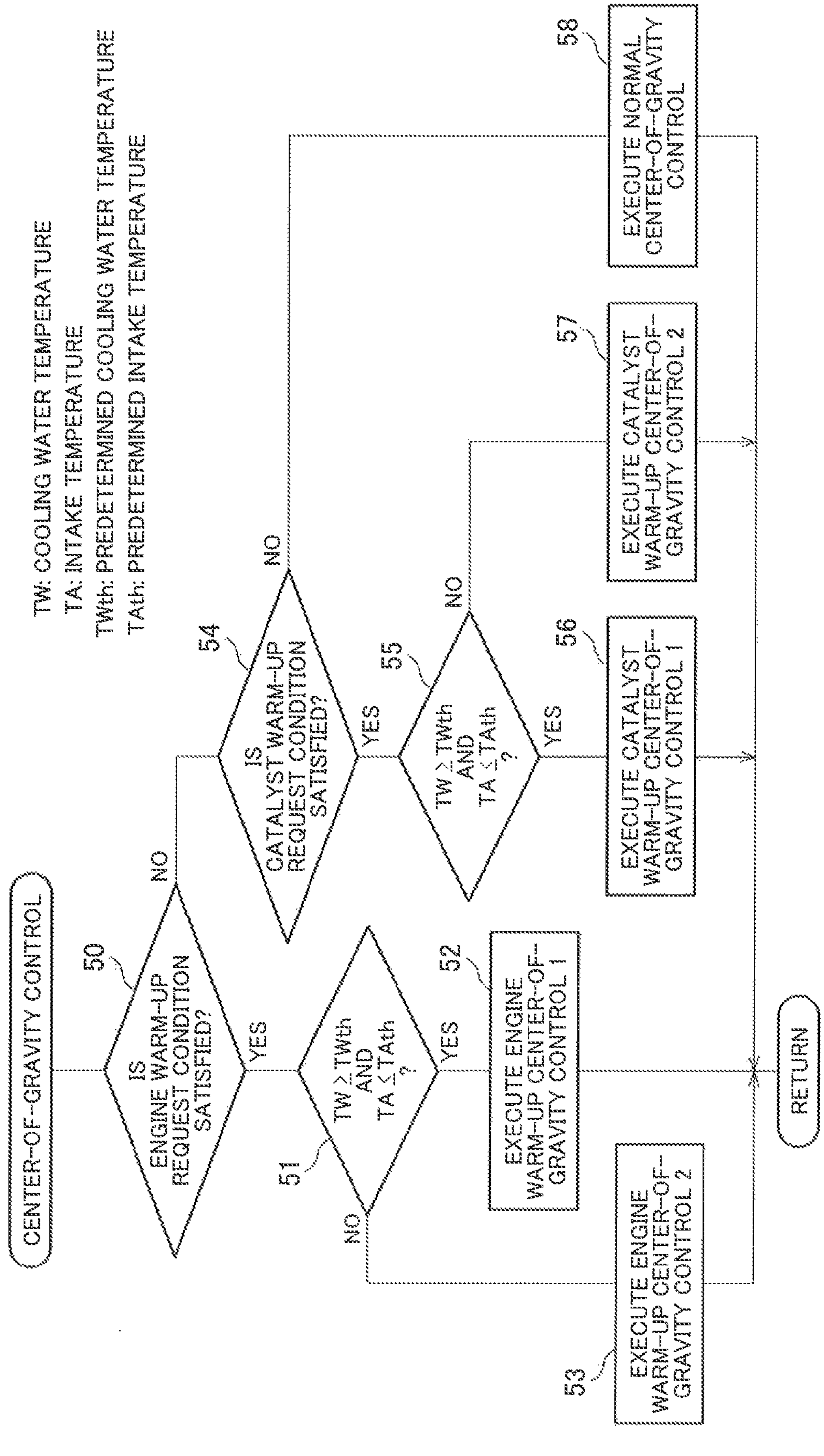
FIG. 14 illustrates an example of a center-of-gravity control flow according to the third embodiment.

Hereinafter, an example of a center-of-gravity control flow according to the third embodiment will be described. This flow is illustrated in FIG. 14. The flow that is illustrated in FIG. 14 is initiated when the start of the engine is initiated or is initiated every time a predetermined period of time elapses while the engine is in operation.

After the flow that is illustrated in FIG. 14 is initiated, it is first determined in Step 50 whether or not the engine warm-up request condition is satisfied. When it is determined that the engine warm-up request condition is satisfied, it is determined in Step 51 whether or not the cooling water temperature TW is equal to or higher than the predetermined cooling water temperature TWth and the intake temperature TA is equal to or lower than the predetermined intake temperature TAth ($TW \geq TWth$ and $TA \leq TAth$). When it is determined that TW is equal to or higher than TWth and TA is equal to or lower than TAth, the engine warm-up center-of-gravity control 1 is executed in Step 52, and then the flow is terminated. In other words, the center-of-gravity position of a heat generation rate is further advanced than the reference position by an increase in the EGR amount. Then, the engine warm-up center-of-gravity control 1 continues to be executed during the execution of the subsequent flow insofar as it is determined in Step 10 that the engine warm-up request condition is satisfied and it is determined in Step 51 that TW is equal to or higher than TWth and TA is equal to or lower than TAth. These controls are terminated in a case where the control other than the engine warm-up center-of-gravity control 1 (that is, the normal center-of-gravity control, the engine warm-up center-of-gravity control 2, the catalyst warm-up center-of-gravity control 1, or the catalyst warm-up center-of-gravity control 2) is executed during the processing of Step 52.

When it is determined in Step 51 that TW is lower than TWth and TA is higher than TAth, the engine warm-up center-of-gravity control 2 is executed in Step 53, and then the flow is terminated. In other words, the center-of-gravity position of a heat generation rate is further advanced than the reference position by an increase in the pilot injection quantity. Then, the engine warm-up center-of-gravity control 2 continues to be executed during the execution of the subsequent flow insofar as it is determined in Step 10 that the engine warm-up request condition is satisfied and it is determined in Step 51 that TW is lower than TWth and TA is higher than TAth. These controls are terminated in a case where the control other than the engine warm-up center-of-gravity control 2 is executed during the processing of Step 53.

When it is determined in Step 50 that the engine warm-up request condition is not satisfied, it is determined in Step 54 whether or not the catalyst warm-up request condition is satisfied. When it is determined that the catalyst warm-up request condition is satisfied, it is determined in Step 13 whether or not the cooling water temperature TW is higher than the predetermined temperature TWth (TW≥TWth and TA≤TAth). When it is determined that TW is equal to or higher than TWth and TA is equal to or lower than TAth, the catalyst warm-up center-of-gravity control 1 is executed in Step 56, and then the flow is terminated. In other words, the center-of-gravity position of a heat generation rate is further retarded than the reference position by a decrease in the EGR amount. Then, the catalyst warm-up center-of-gravity control 1 continues to be executed during the execution of the subsequent flow insofar as it is determined in Step 50 that the engine warm-up request condition is not satisfied, it is determined in Step 54 that the catalyst warm-up request condition is satisfied, and it is determined in Step 55 that TW is equal to or higher than TWth and TA is equal to or lower than TAth. These controls are terminated in a case where the control other than the catalyst warm-up center-of-gravity control 1 is executed during the processing of Step 56.

When it is determined in Step 55 that TW is lower than TWth and TA is higher than TAth, the catalyst warm-up center-of-gravity control 2 is executed in Step 57, and then the flow is terminated. In other words, the center-of-gravity position of a heat generation rate is further retarded than the reference position by a decrease in the pilot injection quantity. Then, the catalyst warm-up center-of-gravity control 2 continues to be executed during the execution of the subsequent flow insofar as it is determined in Step 50 that the engine warm-up request condition is not satisfied, it is determined in Step 54 that the catalyst warm-up request condition is satisfied, and it is determined in Step 55 that TW is lower than TWth and TA is higher than TAth. These controls are terminated in a case where the control other than the catalyst warm-up center-of-gravity control 2 is executed during the processing of Step 57.

When it is determined in Step 54 that the catalyst warm-up request condition is not satisfied, the normal center-of-gravity control is executed in Step 58, and then the flow is terminated. In other words, the center-of-gravity position of a heat generation rate is controlled to correspond to the reference position. Then, the normal center-of-gravity control continues to be executed during the execution of the subsequent flow insofar as it is determined in Step 50 that the engine warm-up request condition is not satisfied and it is determined in Step 54 that the catalyst warm-up request condition is not satisfied. These controls are terminated in a case where the control other than the normal center-of-gravity control is executed during the processing of Step 58.

Summary of Embodiments

To summarize the embodiments of the control device for an internal combustion engine, the control device is a control device for an internal combustion engine that uses the center-of-gravity position of a heat generation rate G for combustion control. The control device is provided with the control unit (ECU) 70 that controls the center-of-gravity position of a heat generation rate to correspond to the reference position in a case where the engine cooling water temperature TW is equal to or higher than the reference cooling water temperature TWb and controls the center-of-gravity position of a heat generation rate to correspond to the crank angle further on the advance side than the reference position (advance position) in a case where the engine cooling water temperature is lower than the reference cooling water temperature.

To summarize the embodiments of the control device for an internal combustion engine, the control device is a control device for an internal combustion engine that is provided with the exhaust gas purification catalysts 42, 44 and uses the center-of-gravity position of a heat generation rate for the combustion control. The control device is provided with the control unit (ECU) 70 that controls the center-of-gravity position of a heat generation rate to correspond to the reference position in a case where the catalyst temperature is equal to or higher than the reference catalyst temperature and controls the center-of-gravity position of a heat generation rate to correspond to the crank angle further on the retard side than the reference position (retard position) in a case where the catalyst temperature is lower than the reference catalyst temperature.

To summarize the embodiments of the control device for an internal combustion engine, the control device is a control device for an internal combustion engine that is provided with the exhaust gas purification catalysts 42, 44 and uses the center-of-gravity position of a heat generation rate for the combustion control. The control device is provided with the control unit (ECU) 70 that controls the center-of-gravity position of a heat generation rate to correspond to the reference position in a case where the engine cooling water temperature TW is equal to or higher than the reference cooling water temperature TWb, controls the center-of-gravity position of a heat generation rate to correspond to the crank angle further on the advance side than the reference position (advance position) in a case where the engine cooling water temperature TW is lower than the center-of-gravity position switching temperature TWs which is lower than the reference cooling water temperature, and controls the center-of-gravity position of a heat generation rate to correspond to the crank angle further on the retard side than the reference position (retard position) in a case where the engine cooling water temperature is lower than the reference cooling water temperature and is equal to or higher than the center-of-gravity position switching temperature.

The control unit (ECU) 70 according to the embodiments controls the center-of-gravity position of a heat generation rate to correspond to the crank angle further on the advance side than the reference position (advance position) by an increase in the EGR amount in a case where the engine cooling water temperature TW is equal to or higher than the predetermined cooling water temperature TWth which is lower than the reference cooling water temperature TWb, and the intake temperature TA is equal to or lower than the predetermined intake temperature TAth when the engine cooling water temperature is lower than the reference cooling water temperature and controls the center-of-gravity position of a heat generation rate to correspond to the crank angle further on the advance side than the reference position (advance position) by an increase in the pilot injection quantity in a case where the engine cooling water temperature is lower than the predetermined cooling water temperature or in a case where the intake temperature is higher than the predetermined intake temperature when the engine cooling water temperature is lower than the reference cooling water temperature.

To summarize the embodiments of the control device for an internal combustion engine, the control device is a control device for an internal combustion engine that uses the center-of-gravity position of a heat generation rate for the combustion control. The control device is provided with the control unit (ECU) 70 that controls the center-of-gravity position of a heat generation rate to correspond to the reference position in a case where the engine warm-up is completed and controls the center-of-gravity position of a heat generation rate to correspond to the crank angle further on the advance side than the reference position (advance position) in a case where the engine warm-up is required.

To summarize the embodiments of the control device for an internal combustion engine, the control device is a control device for an internal combustion engine that is provided with the exhaust gas purification catalysts 42, 44 and uses the center-of-gravity position of a heat generation rate for the combustion control. The control device is provided with the control unit (ECU) 70 that controls the center-of-gravity position of a heat generation rate to correspond to the reference position in a case where the catalyst warm-up is completed and controls the center-of-gravity position of a heat generation rate to correspond to the crank angle further on the retard side than the reference position (retard position) in a case where the catalyst warm-up is required.

To summarize the embodiments of the control device for an internal combustion engine, the control device is a control device for an internal combustion engine that is provided with the exhaust gas purification catalysts 42, 44 and uses the center-of-gravity position of a heat generation rate for the combustion control. The control device is provided with the control unit (ECU) 70 that controls the center-of-gravity position of a heat generation rate to correspond to the reference position in a case where the engine warm-up and the catalyst warm-up are completed, controls the center-of-gravity position of a heat generation rate to correspond to the crank angle further on the advance side than the reference position (advance position) in a case where the engine warm-up is required, and controls the center-of-gravity position of a heat generation rate to correspond to the crank angle further on the retard side than the reference position (retard position) in a case where the catalyst warm-up is required.

The internal combustion engine that uses the center-of-gravity position of a heat generation rate includes not only an internal combustion engine that controls the value of the engine control parameter by using the center-of-gravity position of a heat generation rate itself for the combustion control so that the center-of-gravity position of a heat generation rate corresponds to the reference position but also an internal combustion engine that controls the value of the engine control parameter to correspond to a value which is prepared in advance as the value of the engine control parameter for the control of the center-of-gravity position of a heat generation rate at the reference position.

The control unit (ECU) 70 according to the embodiments controls the center-of-gravity position of a heat generation rate to correspond to the crank angle further on the advance side than the reference position (advance position) by an increase in the EGR amount in a case where the engine cooling water temperature TW is equal to or higher than the predetermined cooling water temperature TWth, and the intake temperature TA is equal to or lower than the predetermined intake temperature TAth and controls the center-of-gravity position of a heat generation rate to correspond to the crank angle further on the advance side than the reference position (advance position) by an increase in the pilot injection quantity in a case where the engine cooling water temperature is lower than the predetermined cooling water temperature or in a case where the intake temperature is higher than the predetermined intake temperature, when the engine warm-up is required.

In the embodiments described above, the reference position is a fixed crank angle not depending on the engine load, not depending on the engine rotational speed, or not depending on either of the engine load or the engine rotational speed in a case where at least the engine load is within a predetermined range. In the embodiments described above, the reference position may also be a crank angle within a fixed range in which a rate of increase in fuel consumption is a value in the vicinity of the minimum value not depending on the engine load, not depending on the engine rotational speed, or not depending on either of the engine load or the engine rotational speed. For example, in the embodiments described above, the reference position may be set to a fixed crank angle at which the running cost of the internal combustion engine is minimized.

<Comparison Between Normal Center-of-Gravity Control and Combustion Center-of-Gravity Control>

An internal combustion engine that uses a combustion center position for the combustion control has been known. The combustion center position is a crank angle pertaining to a point in time when half of the total amount of heat generated in a single expansion stroke is generated. During control that uses the combustion center position, a fuel injection timing, an EGR ratio, and the like are controlled so that the combustion center position is a predetermined position.

Figure 17A:
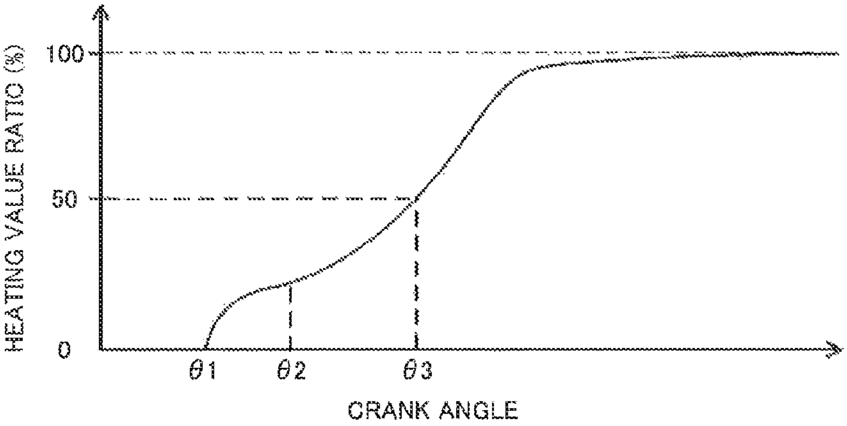
FIG. 17A illustrates a relationship between a crank angle and a heating value ratio pertaining to a case where pilot injection is performed at a specific crank angle and FIG. 17B illustrates a relationship between the crank angle and the heating value ratio pertaining to a case where the pilot injection is performed at a crank angle that is further on an advance side than the specific crank angle.
Figure 17B:
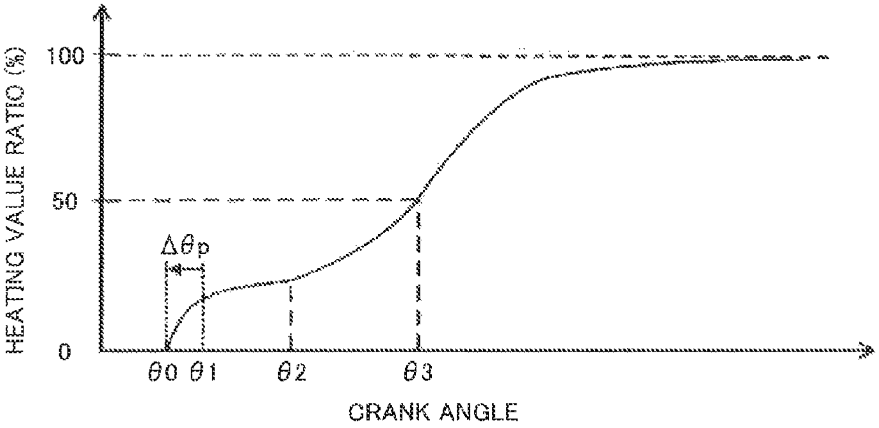

FIG. 17A illustrates a relationship between a crank angle and a heating value ratio pertaining to a case where a pilot injection timing is at a crank angle θ1 and FIG. 17B illustrates a relationship between the crank angle and the heating value ratio pertaining to a case where the pilot injection timing is at a crank angle θ0. The heating value ratio is the ratio of the integrated value of the amount of heat generated from the combustion initiation to each crank angle to the total amount of heat generated in a single expansion stroke. The crank angle θ0 is a crank angle that is on the side further advanced than the crank angle θ1. FIGS. 17A and 17B share the same main injection timing and the same after-injection timing.

As illustrated in FIGS. 17A and 17B, the combustion center position remains at a crank angle θ3 although the pilot injection timing pertaining to the case of FIG. 17B is more advanced than the pilot injection timing pertaining to the case of FIG. 17A by a margin of angle Δθp. Accordingly, it cannot be said that the combustion center position is an index accurately reflecting the form of the combustion of each cycle.

Figure 18A:
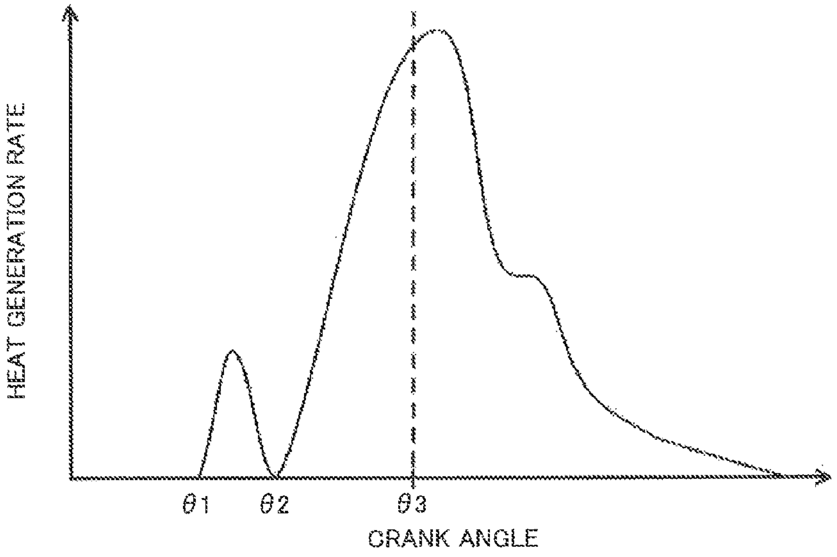
FIG. 18A illustrates a relationship between the crank angle and a heat generation rate pertaining to a case where the pilot injection is performed at the specific crank angle and FIG. 18B illustrates a relationship between the crank angle and the heat generation rate pertaining to a case where the pilot injection is performed at the crank angle on the advance side.
Figure 18B:
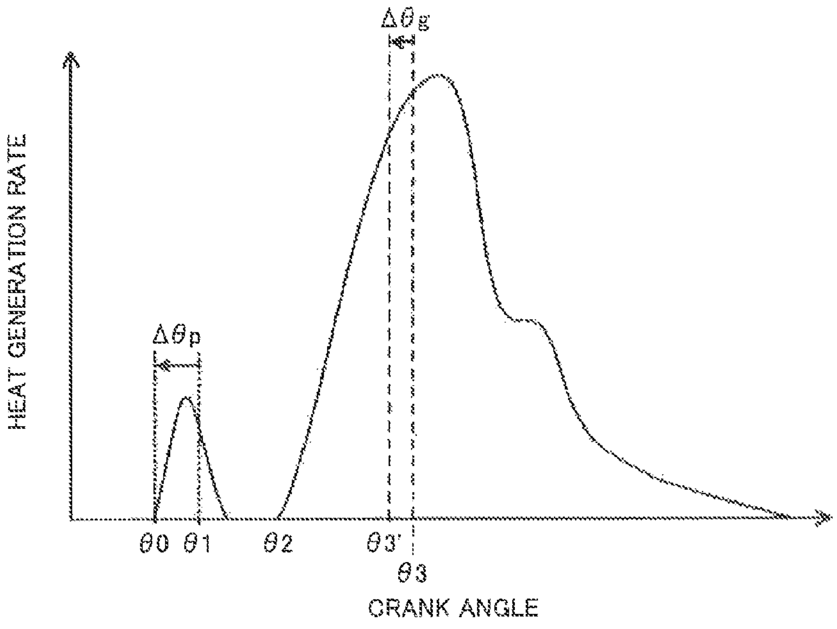

FIG. 18A illustrates a relationship between the crank angle and a heat generation rate pertaining to a case where pilot injection, main injection, and after-injection are performed at the same timings as those in the case of FIG. 17A and FIG. 18B illustrates a relationship between the crank angle and the heat generation rate pertaining to a case where the pilot injection, the main injection, and the after-injection are performed at the same timings as those in the case of FIG. 17B. As illustrated in FIGS. 18A and 18B, the center-of-gravity position of a heat generation rate pertaining to the case of FIG. 18B is at the angle that is on the side further advanced than the center-of-gravity position of a heat generation rate pertaining to the case of FIG. 18A by a margin of an angle Δθg when the pilot injection timing pertaining to the case of FIG. 18B is more advanced than the pilot injection timing pertaining to the case of FIG. 18A by a margin the angle Δθp. Accordingly, it can be said that the center-of-gravity position of a heat generation rate is an index more accurately reflecting the form of the combustion of each cycle than the combustion center position.

Figure 19A:
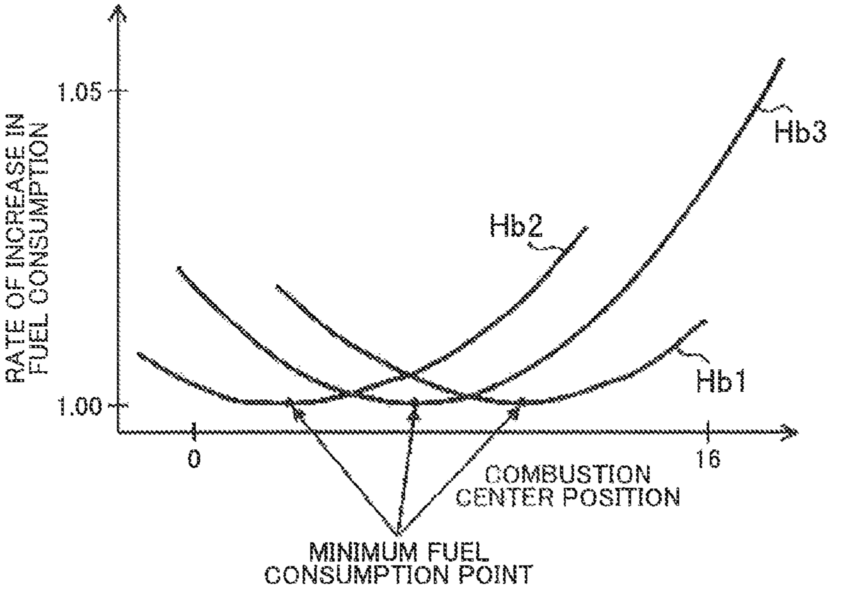
FIG. 19A illustrates a relationship between a combustion center position and a rate of increase in fuel consumption and FIG. 19B illustrates a relationship between the center-of-gravity position of a heat generation rate and the rate of increase in fuel consumption.
Figure 19B:
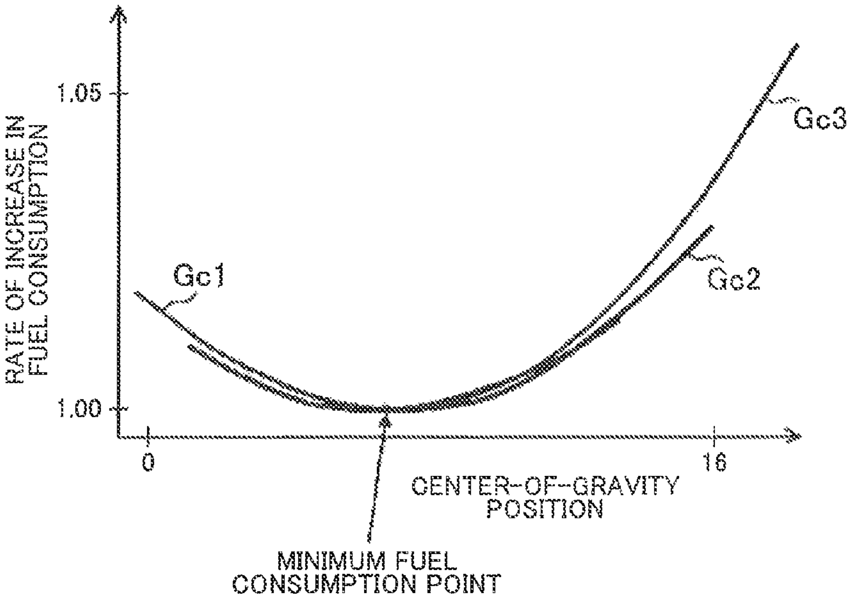

FIG. 19A illustrates a relationship between the combustion center position and a rate of increase in fuel consumption. A curve HL in FIG. 19A shows a relationship pertaining to the case of a low load and a low rotation, a curve HM in FIG. 19A shows a relationship pertaining to the case of a medium load and a medium rotation, and a curve HH in FIG. 19A shows a relationship pertaining to the case of a high load and a high rotation. FIG. 19B illustrates a relationship between the center-of-gravity position of a heat generation rate and a rate of increase in fuel consumption. A curve GL in FIG. 19B shows a relationship pertaining to the case of a low load and a low rotation, a curve GM in FIG. 19A shows a relationship pertaining to the case of a medium load and a medium rotation, and a curve GH in FIG. 19A shows a relationship pertaining to the case of a high load and a high rotation.

As illustrated in FIG. 19A, the combustion center position at which the rate of increase in fuel consumption is minimized varies depending on the engine rotational speed. In other words, the rate of increase in fuel consumption is not minimized, even when a combustion state is controlled so that the combustion center position corresponds to a fixed reference value, when the engine rotational speed varies.

As illustrated in FIG. 19B, the center-of-gravity position of a heat generation rate at which the rate of increase in fuel consumption is minimized is at a fixed crank angle (crank angle 7° past the compression top dead center in particular) even in a case where the engine rotational speed varies. In other words, the rate of increase in fuel consumption is minimized, even at different engine rotational speeds, when the combustion state is controlled so that the center-of-gravity position of a heat generation rate corresponds to a fixed crank angle (crank angle 7° past the compression top dead center in particular). The normal center-of-gravity control according to the embodiments described above, which is based on this knowledge, is to control the center-of-gravity position of a heat generation rate to correspond to the crank angle at which the rate of increase in fuel consumption is minimized (crank angle 7° past the compression top dead center in particular).

<Engine Sound>

In a case where the frequency component of an engine sound (that is, sound released from the internal combustion engine) changes with time, the human auditory perception tends to feel uncomfortable with the sound. The engine sound frequency component has a correlation with a rate of change in in-cylinder pressure (that is, the amount of change in in-cylinder pressure per unit time). Immediately after the initiation of main combustion (that is, the combustion of the fuel that is injected by the main injection), the in-cylinder pressure increases steeply, and thus the rate of change in in-cylinder pressure reaches a maximum. Accordingly, the audibility of the engine sound improves when the rate of change in in-cylinder pressure immediately after the initiation of the main combustion is constant at each cycle. The rate of change in in-cylinder pressure at an arbitrary crank angle has a correlation with the slope of the combustion waveform at the crank angle. Accordingly, when the shapes of the combustion waveforms at the respective cycles are similar to each other, the rate of change in in-cylinder pressure immediately after the initiation of the main combustion is constant at each cycle, and thus the audibility of the engine sound is improved.

Figure 15:
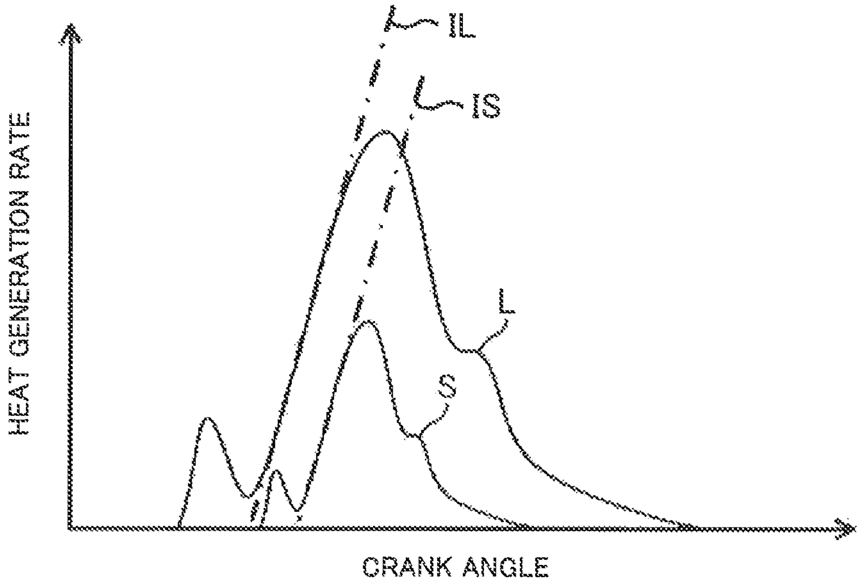
FIG. 15 is a drawing for showing a relationship between a combustion waveform and an engine sound.

A curve S in FIG. 15 represents the combustion waveform at a low output and a curve L in FIG. 15 represents the combustion waveform at a high output. In each of the combustion waveforms, the heat generation rate temporarily increases and reaches a peak based on the combustion of the pilot fuel (that is, the fuel which is injected by the pilot injection), decreases and reaches the minimum thereafter, and then increases again and reaches a peak based on the combustion of the main fuel (that is, the fuel which is injected by the main injection).

A one-dot chain line IS in FIG. 15 is the tangent of the combustion waveform S at a low output that is obtained immediately after the initiation of the main combustion (that is, the combustion of the main fuel), and the slope thereof is equal to the slope of the combustion waveform S that is obtained immediately after the initiation of the main combustion, that is, the rate of increase in heat generation rate which is obtained immediately after the initiation of the main combustion. A one-dot chain line IL in FIG. 15 is the tangent of the combustion waveform L at a high output that is obtained immediately after the initiation of the main combustion, and the slope thereof is equal to the slope of the combustion waveform L that is obtained immediately after the initiation of the main combustion, that is, the rate of increase in heat generation rate which is obtained immediately after the initiation of the main combustion.

In the event of an increase in required output and a change of the combustion waveform from the combustion waveform S into the combustion waveform L, the engine sound has a higher level of audibility, than in the opposite case, in a case where the slope IL of the combustion waveform L is equal to the slope IS of the combustion waveform S.

Figure 16A:
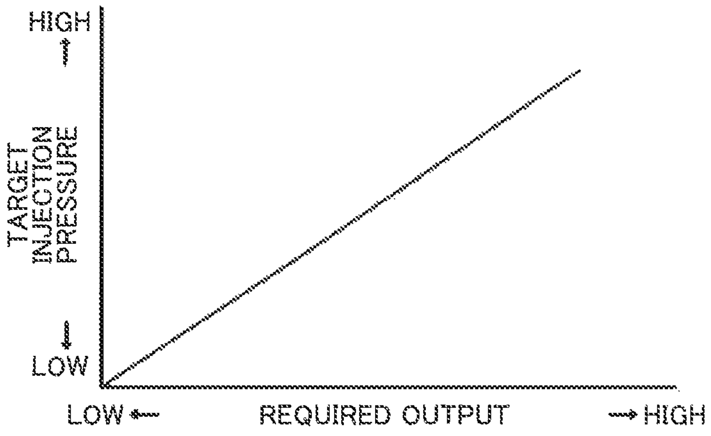
FIG. 16A illustrates a relationship between a required output and a target injection pressure and FIG. 16B illustrates a relationship between the required output and the target injection pressure.
Figure 16B:
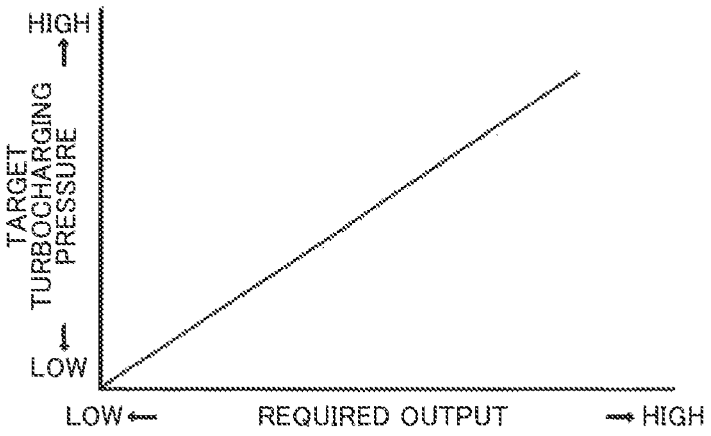

In the embodiments described above, the value of the engine control parameter may be changed so that the rate of increase in heat generation rate immediately after the initiation of the main combustion for each cycle becomes constant in a case where the value of the engine control parameter is changed. In a case where the required output is constant, the value of the engine control parameter may be changed so that at least one of the injection pressure and the turbocharging pressure is maintained at a constant level regardless of the engine rotational speed. Alternatively, the value of the engine control parameter may be changed so that at least one of the injection pressure and the turbocharging pressure becomes proportional to the required output as illustrated in FIGS. 16A and 16B. Then, fuel consumption is reduced and the audibility of the engine sound is improved at the same time.

<Example of Normal Center-of-Gravity Control>

Hereinafter, an example of the normal center-of-gravity control will be described. In this example, the main injection timing and the pilot injection timing that allow the required output to be output to the engine and allow the center-of-gravity position of a heat generation rate to correspond to the reference position are obtained in advance through an experiment or the like for each required output, injection quantity (or pilot injection quantity and main injection quantity), injection pressure, and turbocharging pressure and these main injection timing and pilot injection timing are stored in the ECU 70 in the form of a map (hereinafter, referred to as an "injection timing map") of a function of the required output, the injection quantity (or the main injection quantity and the pilot injection quantity), the injection pressure, and the turbocharging pressure.

An injection quantity that is required for the output of the required output (hereinafter, referred to as a "target injection quantity") is set during the normal center-of-gravity control. Then, a target pilot injection quantity and a target main injection quantity are set based on the target injection quantity. The ratio of the target pilot injection quantity that is correlated with the target injection quantity is, for example, determined based on the cooling water temperature (that is, the engine temperature) and the engine rotational speed. In addition, a target injection pressure is set from FIG. 16A based on the required output and a target turbocharging pressure is set from FIG. 16B based on the required output.

Then, a target pilot injection timing and a target main injection timing are set from the injection timing map based on the required output, the target injection quantity (or the target pilot injection quantity and the target main injection quantity), the target injection pressure, and the target turbocharging pressure.

In a case where the center-of-gravity position of a heat generation rate is further advanced than the reference position (or in a case where the center-of-gravity position of a heat generation rate is further advanced than the reference position by a margin of at least a predetermined value), the set target pilot injection timing and the set target main injection timing are retarded. The amount of the retarding pertaining to this case may be a constant amount or may be an amount that has a correlation with the amount of deviation of the center-of-gravity position of a heat generation rate with respect to the reference position. Then, the pilot injection and the main injection are performed on the retarded target pilot injection timing and the retarded target main injection timing, respectively.

In a case where the center-of-gravity position of a heat generation rate is further retarded than the reference position (or in a case where the center-of-gravity position of a heat generation rate is further advanced than the reference position), the set target pilot injection timing and the set target main injection timing are advanced. The amount of the advancing pertaining to this case may be a constant amount or may be an amount that has a correlation with the amount of deviation of the center-of-gravity position of a heat generation rate with respect to the reference position. Then, the pilot injection and the main injection are performed on the advanced target pilot injection timing and the advanced target main injection timing, respectively.

In this example, an upper limit value of the injection quantity may be set and the target injection quantity may be limited by the upper limit value. The upper limit value of the injection quantity is, for example, is the lower one of the upper limit value of the injection quantity at which the amount of smoke generation by the engine is suppressed to a predetermined amount or less and the upper limit value of the injection quantity at which engine torque is suppressed to an allowable value or less regarding the driving system of the vehicle or the like.

The invention is also applicable in a case where the main injection and the after-injection are performed without the pilot injection being performed, in a case where the pilot injection and the main injection are performed without the after-injection being performed, and in a case where only the main injection is performed without the pilot injection and the after-injection being performed.

The invention claimed is:

1. A control device for an internal combustion engine, the control device comprising:

an electronic control unit configured to control the internal combustion engine in a case where a cooling water temperature pertaining to the internal combustion engine is equal to or higher than a reference cooling water temperature such that a center-of-gravity position of a heat generation rate of the internal combustion engine corresponds to a crank angle at a reference position, the electronic control unit being configured to control the internal combustion engine in a case where the cooling water temperature pertaining to the internal combustion engine is lower than the reference cooling water temperature such that the center-of-gravity position of a heat generation rate corresponds to a crank angle further on an advance side than the reference position.

2. The control device according to claim 1, wherein the reference position is a fixed crank angle or a crank angle within a fixed range not depending on a load of the internal combustion engine, not depending on a rotational speed of the internal combustion engine, or not depending on either of the load or the rotational speed of the internal combustion engine in a case where at least the load of the internal combustion engine is within a predetermined range.

3. The control device according to claim 1, wherein the electronic control unit is configured to calculate the center-of-gravity position of a heat generation rate as a crank angle corresponding to a geometric center of gravity of a region surrounded by a waveform of the heat generation rate drawn in a graph in which the crank angle for each cycle is set on one axis and the heat generation rate is set on the other axis orthogonal to the axis, and the axis.

4. The control device according to claim 1, wherein the electronic control unit is configured to calculate the center-of-gravity position of a heat generation rate as a crank angle corresponding to a geometric center of gravity of a region defined by a waveform of the heat generation rate with respect to the crank angle.

5. The control device according to claim 1, wherein the electronic control unit is configured to calculate the center-of-gravity position of a heat generation rate as a specific crank angle at which a value obtained by integrating a value corresponding to a product of a value obtained by subtracting the specific crank angle from an arbitrary crank angle for each cycle and the heat generation rate at the arbitrary crank angle with respect to the crank angle is 0.

6. The control device according to claim 1, wherein the electronic control unit is configured to calculate the center-of-gravity position of a heat generation rate as a specific crank angle pertaining to a case where a value obtained by integrating a product of a crank angle difference between an arbitrary crank angle further on the advance side than the specific crank angle and the specific crank angle, and the heat generation rate at the arbitrary crank angle with respect to a crank angle and a value obtained by integrating a product of a crank angle difference between an arbitrary crank angle further on a retard side than the specific crank angle and the specific crank angle, and the heat generation rate at the arbitrary crank angle with respect to a crank angle are equal to each other.

7. The control device according to claim 1, wherein the electronic control unit is configured to calculate the center-of-gravity position of a heat generation rate as an arbitrary crank angle pertaining to a case where a total sum of a product of each heat generation rate further on the advance side than the arbitrary crank angle and crank angle distances respectively corresponding to the heat generation rates is equal to the total sum of a product of each heat generation rate further on a retard side than the arbitrary crank angle and crank angle distances respectively corresponding to the heat generation rates, the crank angle distance being a crank angle difference between the arbitrary crank angle and each crank angle.

8. The control device according to claim 1, wherein the electronic control unit is configured to calculate the center-of-gravity position of a heat generation rate as Gc acquired by a calculation based on the following equation, $$Gc = \frac{\int_{CAs}^{CAe} (\theta - CAs)\, dQ(\theta) d\theta}{\int_{CAs}^{CAe} dQ(\theta) d\theta} + CAs \quad (1)$$

in which CAs is a crank angle at which combustion of fuel begins for each cycle, CAe is a crank angle at which the combustion terminates, θ is an arbitrary crank angle, dQ(θ) is a heat generation rate at the crank angle θ, and Gc is the center-of-gravity position of a heat generation rate.

9. The control device according to claim 1, wherein the electronic control unit is configured to calculate the center-of-gravity position of a heat generation rate as a value obtained by adding a combustion initiation crank angle to a value obtained by dividing an integral value of a product of a difference between an arbitrary crank angle, and the combustion initiation crank angle and the heat generation rate at the arbitrary crank angle with respect to the crank angle by an area of a region defined by a waveform of the heat generation rate with respect to the crank angle.

10. The control device according to claim 1, wherein the electronic control unit is configured to calculate the center-of-gravity position of a heat generation rate as a value obtained by adding a combustion initiation crank angle to a value obtained by dividing an integral value of a product of a crank angle distance and the heat generation rate corresponding to the crank angle distance with respect to a crank angle by an area of a region defined by a waveform of the heat generation rate with respect to the crank angle, the crank angle distance being a crank angle difference between the combustion initiation crank angle and each crank angle.

11. A control device for an internal combustion engine, the internal combustion engine including an exhaust gas purification catalyst, the control device comprising:

an electronic control unit configured to control the internal combustion engine in a case where a temperature pertaining to the exhaust gas purification catalyst is equal to or higher than a reference catalyst temperature such that a center-of-gravity position of a heat generation rate of the internal combustion engine corresponds to a crank angle at a reference position, the electronic control unit being configured to control the internal combustion engine in a case where the temperature pertaining to the exhaust gas purification catalyst is lower than the reference catalyst temperature such that the center-of-gravity position of a heat generation rate corresponds to a crank angle further on a retard side than the reference position.

12. A control device for an internal combustion engine, the internal combustion engine including an exhaust gas purification catalyst, the control device comprising:

an electronic control unit configured to control the internal combustion engine in a case where a cooling water temperature pertaining to the internal combustion engine is equal to or higher than a reference cooling water temperature such that a center-of-gravity position of a heat generation rate of the internal combustion engine corresponds to a crank angle at a reference position, the electronic control unit being configured to control the internal combustion engine in a case where the cooling water temperature pertaining to the internal combustion engine is lower than a center-of-gravity position switching temperature such that the center-of-gravity position of a heat generation rate corresponds to a crank angle further on an advance side than the reference position, the center-of-gravity position switching temperature being a temperature lower than the reference cooling water temperature, and the electronic control unit being configured to control the internal combustion engine in a case where the cooling water temperature pertaining to the internal combustion engine is equal to or higher than the center-of-gravity position switching temperature such that the center-of-gravity position of a heat generation rate corresponds to a crank angle further on a retard side than the reference position.

13. A control device for an internal combustion engine, the control device comprising:

an electronic control unit configured to control the internal combustion engine in a case where warm-up of the internal combustion engine is completed such that a center-of-gravity position of a heat generation rate of the internal combustion engine corresponds to a crank angle at a reference position, the electronic control unit being configured to control the internal combustion engine in a case where an engine warm-up of the internal combustion engine is required such that the center-of-gravity position of a heat generation rate corresponds to a crank angle further on an advance side than the reference position.

14. The control device according to claim 13, wherein the electronic control unit is configured to control an EGR amount pertaining to the internal combustion engine, wherein the electronic control unit is configured to control a pilot injection quantity pertaining to the internal combustion engine, wherein the electronic control unit is configured to increase the EGR amount in a case where a cooling water temperature pertaining to the internal combustion engine is equal to or higher than a predetermined cooling water temperature, and an intake temperature is equal to or lower than a predetermined intake temperature, when the warm-up of the internal combustion engine is required such that the center-of-gravity position of a heat generation rate corresponds to the crank angle further on the advance side than the reference position, and wherein the electronic control unit is configured to increase the pilot injection quantity in a case where the cooling water temperature pertaining to the internal combustion engine is lower than the predetermined cooling water temperature or in a case where the intake temperature is higher than the predetermined intake temperature such that the center-of-gravity position of a heat generation rate corresponds to the crank angle further on the advance side than the reference position.

15. A control device for an internal combustion engine, the internal combustion engine including an exhaust gas purification catalyst, the control device comprising:

an electronic control unit configured to control the internal combustion engine in a case where warm-up of the exhaust gas purification catalyst is completed such that a center-of-gravity position of a heat generation rate of the internal combustion engine corresponds to a crank angle at a reference position, the electronic control unit being configured to control the internal combustion engine in a case where the warm-up of the exhaust gas purification catalyst is required such that the center-of-gravity position of a heat generation rate corresponds to a crank angle further on a retard side than the reference position.

16. A control device for an internal combustion engine, the internal combustion engine including an exhaust gas purification catalyst, the control device comprising:

an electronic control unit configured to control the internal combustion engine in a case where warm-up of the internal combustion engine and warm-up of the exhaust gas purification catalyst are completed such that a center-of-gravity position of a heat generation rate corresponds to a crank angle at a reference position, the electronic control unit being configured to control the internal combustion engine in a case where the warm-up of the internal combustion engine is required such that the center-of-gravity position of a heat generation rate corresponds to a crank angle further on an advance side than the reference position, and the electronic control unit being configured to control the internal combustion engine in a case where the warm-up of the exhaust gas purification catalyst is required such that the center-of-gravity position of a heat generation rate corresponds to a crank angle further on a retard side than the reference position.

17. The control device according to claim 1, wherein the electronic control unit is configured to control an EGR amount pertaining to the internal combustion engine, wherein the electronic control unit is configured to control a pilot injection quantity pertaining to the internal combustion engine, wherein the electronic control unit is configured to increase the EGR amount in a case where the cooling water temperature pertaining to the internal combustion engine is lower than the reference cooling water temperature, the cooling water temperature pertaining to the internal combustion engine is equal to or higher than a center-of-gravity position switching temperature, and an intake temperature is equal to or lower than a predetermined intake temperature such that the center-of-gravity position of a heat generation rate corresponds to the crank angle further on the advance side than the reference position, the center-of-gravity position switching temperature being a temperature lower than the reference cooling water temperature, and wherein the electronic control unit is configured to increase a pilot injection quantity in a case where the cooling water temperature pertaining to the internal combustion engine is lower than the reference cooling water temperature and the cooling water temperature pertaining to the internal combustion engine is lower than the center-of-gravity position switching temperature or in a case where the cooling water temperature pertaining to the internal combustion engine is lower than the reference cooling water temperature and the intake temperature is higher than the predetermined intake temperature such that the center-of-gravity position of a heat generation rate corresponds to the crank angle further on the advance side than the reference position.

* * * * *